United States Patent
Starsinic et al.

(10) Patent No.: US 12,425,954 B2
(45) Date of Patent: *Sep. 23, 2025

(54) SNPN ONBOARDING AND OBTAINING SNPN SERVICES FROM A PLMN

(71) Applicant: INTERDIGITAL PATENT HOLDINGS, INC., Wilmington, DE (US)

(72) Inventors: Michael Starsinic, Newtown, PA (US); Hongkun Li, Malvern, PA (US); Quang Ly, North Wales, PA (US); Catalina Mladin, Hatboro, PA (US); Jiwan Ninglekhu, Royersford, PA (US); Pascal Adjakple, Great Neck, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/907,177

(22) PCT Filed: Mar. 23, 2021

(86) PCT No.: PCT/US2021/023665
§ 371 (c)(1),
(2) Date: Sep. 23, 2022

(87) PCT Pub. No.: WO2021/195075
PCT Pub. Date: Sep. 30, 2021

(65) Prior Publication Data
US 2024/0224163 A1   Jul. 4, 2024

Related U.S. Application Data

(60) Provisional application No. 63/057,920, filed on Jul. 29, 2020, provisional application No. 62/994,916, filed on Mar. 26, 2020.

(51) Int. Cl.
  *H04W 48/12*  (2009.01)
  *H04W 12/06*  (2021.01)
  (Continued)

(52) U.S. Cl.
  CPC ........... *H04W 48/12* (2013.01); *H04W 12/06* (2013.01); *H04W 48/18* (2013.01); *H04W 84/105* (2013.01)

(58) Field of Classification Search
  CPC ..... H04W 48/12; H04W 12/06; H04W 48/18; H04W 84/105; H04W 4/06; H04W 48/16;
  (Continued)

(56) References Cited

U.S. PATENT DOCUMENTS

| 9,871,778 B1 | 1/2018 | Taralika et al. |
| 2020/0053083 A1 | 2/2020 | Kunz et al. |
| 2020/0329422 A1 | 10/2020 | Sirotkin et al. |

FOREIGN PATENT DOCUMENTS

| CN | 109964509 A | 7/2019 | |
| WO | WO-2019089164 A1 * | 5/2019 | ......... H04L 63/1458 |

OTHER PUBLICATIONS

3rd Generation Partnership Project; Technical Specification Group Service and System Aspects; Study on enhanced support of Non-Public Networks (Release 17) 3GPP TR 23.700-07 V0.3.0, Jan. 2020 (Jan. 2020), pp. 15-16, 27-30, 34-35. (Year: 2020).*

(Continued)

*Primary Examiner* — Brandon J Miller
(74) *Attorney, Agent, or Firm* — Mark D. Pratt

(57) ABSTRACT

A user equipment (UE) operating in an "Onboarding Mode" may search for a network broadcasting Onboarding Capability Information (OCI), then register using onboarding credentials and receive SNPN credentials from the network. The UE may then exit onboarding mode, enter Manual Network Selection or Automatic Network Selection mode, (Continued)

and connect to the SNPN. A UE may also receive from a network a list of PLMNs and SNPNs that are equivalent then, when registering, indicate to the network that a requested slice is not associated with the UE's HPLMN, but is associated with an SNPN. The network may indicate to the UE how the slices of the network map to the slices of the SNPN, and may indicate whether a slice that is offered by the network only partially maps to a slice of the SNPN or HPLMN.

31 Claims, 16 Drawing Sheets

(51) Int. Cl.
    *H04W 48/18*     (2009.01)
    *H04W 84/10*     (2009.01)

(58) Field of Classification Search
    CPC ..... H04W 60/00; H04W 48/10; H04W 48/14; H04W 60/04
    See application file for complete search history.

(56) References Cited

OTHER PUBLICATIONS

3rd Generation Partnership Project; Technical Specification Group Service and System Aspects; Study on enhanced support of Non-Public Networks (Release 17) 3GPPP TR 23.700-07 V0.3.0, Jan. 2020 (Jan. 2020), pp. 15-16, 26-30, 34-35. (Year: 2020).*

"3 Generation Partnership Project; Technical Specification Group Services and System Aspects; Security architecture and procedures for 5G system (Release 16)", 3GPP TS 33.501, V16.1.0, Dec. 31, 2019.

"3rd Generation Partnership Project; Technical Specification Group Services and System Aspects; Procedures for the 5G System (5GS); Stage 2 (Release 16)", 3GPP TS 23.502, V16.4.0, Mar. 25, 2020.

"3rd Generation Partnership Project; Technical Specification Group Services and System Aspects; Study on enhanced support of Non-Public Networks (Release 17)", 3GPP TR 23.700-07, V0.3.0, Jan. 28, 2020.

"3rd Generation Partnership Project; Technical Specification Group Services and System Aspects; System architecture for the 5G System (6GS); Stage 2 (Release 16)", 3GPP TS 23.501, V16.4.0, Mar. 23, 2020.

3GPP TS 23.003, "Numbering, addressing and identification," Technical Specification Group Core Network and Terminals, Release 15, V.16.4.0, Sep. 2020, pp. 141.

3GPP TS 24.008, "Mobile radio interface layer 3 specification," Core network protocols; Stage 3, Technical Specification Group Core Network and Terminals, Release 16, V.16.6.0, Sep. 2020, pp. 796.

3GPP TS 24.501, "Non-Access-Stratum (NAS) protocol for 5G System (5GS)" Stage 3, Technical Specification Group Core Network and Terminals, Release 17, V17.1.0, Dec. 2020, pp. 746.

3rd Generation Partnership Project; Technical Specification Group Service and System Aspects; Study on enhanced support of Non-Public Networks (Release17), 3GPP TR 23.700-07 V0.3.0, Jan. 2020, 42 pages (see, e.g., pp. 15-16, 27-30 and 34-35).

Huawei et al., "Key Issue: UE Onboarding and Provisioning for non-public networks", S2-1911761, SA WG2 Meeting #135, Split, Croatia, Oct. 14-18, 2019, 4 pages.

* cited by examiner

| 8 | 7 | 6 | 5 | 4 | 3 | 2 | 1 | |
|---|---|---|---|---|---|---|---|---|
| | | SNPN List IEI | | | | | | Octet 1 |
| Length of SNPN List Contents | | | | | | | | Octet 2 |
| Number of SNPNs for PLMN 1 | | | | | | | | Octet 3 |
| MCC Digit 2, PLMN 1 | | | | MCC Digit 1, PLMN 1 | | | | Octet 4 |
| MNC Digit 3, PLMN 1 | | | | MCC Digit 3, PLMN 1 | | | | Octet 5 |
| MNC Digit 2, PLMN 1 | | | | MNC Digit 1, PLMN 1 | | | | Octet 6 |
| PLMN 1, NID 1 Hexadecimal Digits 1 and 2 | | | | | | | | Octet 7 |
| PLMN 1, NID 1 Hexadecimal Digits 3 and 4 | | | | | | | | Octet 8 |
| PLMN 1, NID 2 Hexadecimal Digits 1 and 2 | | | | | | | | Octet 9 |
| PLMN 1, NID 2 Hexadecimal Digits 3 and 4 | | | | | | | | Octet 10 |
| Number of SNPNs for PLMN 15 | | | | | | | | |
| MCC Digit 2, PLMN 15 | | | | MCC Digit 1, PLMN 15 | | | | Octet N |
| MNC Digit 3, PLMN 15 | | | | MCC Digit 3, PLMN 15 | | | | Octet N+1 |
| MNC Digit 2, PLMN 15 | | | | MNC Digit 1, PLMN 15 | | | | Octet N+2 |
| PLMN 15, NID 1 Hexadecimal Digits 1 and 2 | | | | | | | | Octet N+3 |
| PLMN 15, NID 1 Hexadecimal Digits 3 and 4 | | | | | | | | Octet N+4 |
| PLMN 15, NID 2 Hexadecimal Digits 1 and 2 | | | | | | | | Octet N+5 |
| PLMN 15, NID 2 Hexadecimal Digits 3 and 4 | | | | | | | | Octet N+6 |

FIG. 6

| 8 | 7 | 6 | 5 | 4 | 3 | 2 | 1 | |
|---|---|---|---|---|---|---|---|---|
| colspan=8 | S-NSSAI IEI | | | | | | | Octet 1 |
| colspan=8 | Length of S-NSSAI Contents | | | | | | | Octet 2 |
| colspan=8 | SST | | | | | | | Octet 3 |
| colspan=8 | SD | | | | | | | Octet 4* |
| | | | | | | | | Octet 6* |
| colspan=8 | Mapped HPLMN SST or Mapped SNPN SST | | | | | | | Octet 7* |
| colspan=8 | Mapped HPLMN SD or Mapped SNPN SD | | | | | | | Octet 8* |
| | | | | | | | | Octet 10* |
| MCC Digit 2, SNPN PLMN | | | | MCC Digit 1, SNPN PLMN | | | | Octet 11* |
| MNC Digit 3, SNPN PLMN | | | | MCC Digit 3, SNPN PLMN | | | | Octet 12* |
| MNC Digit 2, SNPN PLMN | | | | MNC Digit 1, SNPN PLMN | | | | Octet 13* |
| NID Hexadecimal Digits 1 and 2 | | | | | | | | Octet 14* |
| NID Hexadecimal Digits 3 and 4 | | | | | | | | Octet 15* |

FIG. 7

SNPN ONBOARDING AND OBTAINING SNPN SERVICES FROM A PLMN

CROSS-REFERENCE TO RELATED APPLICATIONS

This application is the National Stage Application of International Patent Application No. PCT/US2021/023665, filed Mar. 23, 2021, which claims the benefit of U.S. Provisional Patent Application No. 62/994,916, filed 26 Mar. 2020, and U.S. Provisional Patent Application No. 63/057,920, filed 29 Jul. 2020, the contents of which are hereby incorporated by reference herein.

BACKGROUND

This disclosure pertains to the management of devices in wireless networks, such as, for example, devices and networks as described in 3GPP TS 23.501, System architecture for the 5G System (5GS), 3GPP TS 23.502, Procedures for the 5G System (5GS); 3GPP TS 23.003, Numbering, addressing and identification; 3GPP TS 24.501, Non-Access-Stratum (NAS) protocol for 5G System (5GS), Stage 3, 3GPP TR 23.700-07, Study on enhanced support of non-public networks; and 3GPP TS 24.008, Mobile radio interface Layer 3 specification; Core network protocols; Stage 3.

SUMMARY

A user equipment (UE) operating in an "Onboarding Mode" may search for a network broadcasting Onboarding Capability Information (OCI), then send a registration request to the network with onboarding credentials. The UE may also send information to the RAN node to help the RAN node select an AMF that supports onboarding. The UE then receives SNPN credentials from the network, and thereafter exits onboarding mode, enters Manual Network Selection or Automatic Network Selection mode, and connects to the SNPN.

A UE may also receive from a network a list of PLMNs and SNPNs that are equivalent. When registering with a network, the UE may then indicate to the network that a requested slice is not associated with the UE's HPLMN, but is associated with an SNPN. The network may indicate to the UE how the slices of the network map to the slices of the SNPN.

The network can indicate whether a slice that is offered by the network only partially maps to a slice of the SNPN or HPLMN.

The network may also indicate to the UE that the network is not able, or is not willing, to onboard the UE. The UE determine which what network to connect to when multiple networks which are broadcasting an indication that they are capable of onboarding devices. The UE and the network may authenticate each other before performing an onboarding operation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings.

FIG. 6 illustrates an example SNPN list information element.

FIG. 7 illustrates an example S-NSSAI enhanced to carry SNPN information.

DETAILED DESCRIPTION

Abbreviations

Many of the abbreviations used herein are described in Table 1 of the Appendix. It will be appreciated that both AAA-S and DN-AAA are types of AAA Servers.

User Equipment (UE)

A UE traditionally refers to a mobile phone, mobile computer, mobile broadband adaptor, connected vehicle, connected device, etc. that can connect to a cellular network. The UE has an MT (Mobile Termination) part which provides a cellular radio interface and a TE (Terminal Equipment) part that offers services to a user and does not typically provide features that are specific to the cellular radio interface part. For example, the TE might provide a control GUI. A UE may also have a SIM that stores user credentials and network identities. It should be appreciated that the ideas in this paper equally apply to devices that do not have a SIM to store user credentials and network identities. Devices can instead store user credentials and network identities in other forms of non-volatile memory. Thus, all ideas in this paper that are described as applying to a UE, could equally apply to any device that is attempting to onboard with a network.

UE Onboarding

UE Onboarding, as defined in TR 23.700-07, is the act of provisioning in a UE the information that a UE requires for the UE to get authorized access and connectivity to an NPN.

Non-Public Network (NPN)

A Non-Public Network (NPN) is a 5GS deployed for non-public use. An NPN may be deployed as a Stand-alone Non-Public Network (SNPN), e.g., operated by an NPN operator and not relying on network functions provided by a PLMN, or a Public Network Integrated NPN (PNI-NPN), e.g., a non-public network deployed with the support of a PLMN. This is further described in section 5.30 of TS 23.501.

Figure 1:
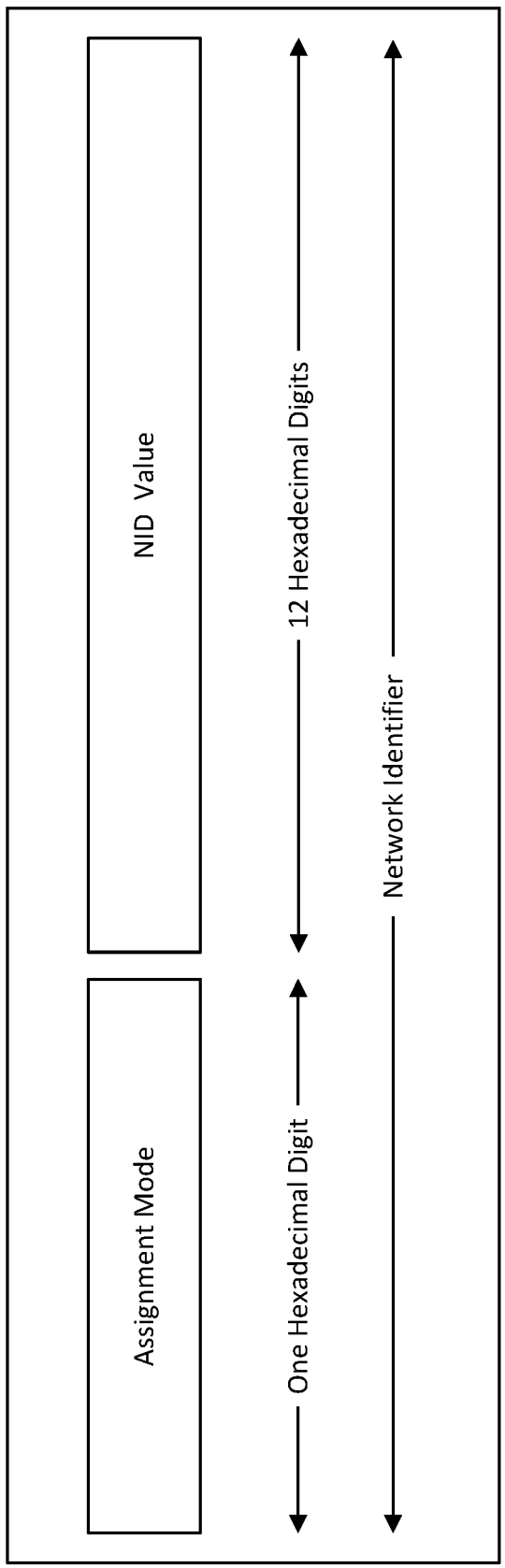
FIG. 1 illustrates an example Network Identifier (NID).

As is explained in TS 23.003, the combination of a PLMN ID and Network identifier (NID) identifies an SNPN. The NID consists of an assignment mode and an NID value as shown in FIG. 1.

The NID assignment mode may be "locally managed" or "not locally managed". If the assignment mode is "not locally managed", the NID may be assigned such that it is globally unique independent of the PLMN ID used or the NID may be assigned such that the combination of the NID and the PLMN ID is globally unique.

It should be appreciated that solution that are described in this paper for SNPNs may also be applied to other types of NPNs (e.g. a PNI-NPN).

SNPN Access Mode

If a UE is not set to operate in SNPN access mode, the UE will decode the broadcast system information and take the information concerning available PLMN IDs into account in PLMN and cell (re-)selection procedures.

If a UE is set to operate in SNPN access mode, the UE will decode the broadcast system information and take the information concerning available PLMN IDs and NIDs into account in network and cell (re-)selection procedures.

Network Selection in SNPN Access Mode

UEs operating in SNPN access mode read the available PLMN IDs and list of available NIDs from the broadcast system information and take them into account during network selection.

For automatic network selection, the UE selects and attempts to register with the available SNPN identified by a PLMN ID and NID for which the UE has SUPI and credentials. If multiple SNPNs are available that the UE has respective SUPI and credentials for, then the priority order for selecting and attempting to register with SNPNs is based on UE implementation.

For manual network selection UEs operating in SNPN access mode provide to the user the list of NIDs and related human-readable names (if available) of the available SNPNs the UE has respective SUPI and credentials for.

When a UE performs Initial Registration to an SNPN, the UE indicates the selected NID and the corresponding PLMN ID to NG-RAN. NG-RAN informs the AMF of the selected PLMN ID and NID.

Equivalent PLMN (EPLMN)

The UE stores lists of equivalent PLMNs. These PLMNs shall be regarded by the UE as equivalent to each other for PLMN selection and cell selection/re-selection. The UE updates the list that is associated with a PLMN at the end of each registration procedure. This is further described in TS 24.501.

As is explained in TS 23.502, when a UE registers in an SNPN, the network does not provide a list of equivalent PLMNs to the UE.

Connecting to a Non-Public Network

As described in TS 23.501, section 5.30.2.2, NG-RAN nodes which provide access to SNPNs broadcast PLMN IDs and a list of NIDs per PLMN ID. The NID(s) identify the non-public networks that the NG-RAN provides access to.

As described in TS 23.502, section 4.2.2.2.2, when the UE sends a Registration Request to NG-RAN, the UE includes AN parameters. The AN parameters information element includes the Selected PLMN ID (or PLMN ID and NID).

Network Slicing in 5GC

A Network Slice is defined as a logical network that provides specific network capabilities and network characteristics. A Network Slice within a PLMN includes the Core Network Control Plane and User Plane Network Functions. Network Slice instance is defined as a set of Network Function instances and the required resources (e.g. compute, storage and networking resources) which form a deployed Network Slice.

Network slices may differ for supported features and network function optimizations, in which case such Network Slices may be of different Slice/Service Types. The operator can deploy multiple Network Slice instances delivering the same features but for different groups of UEs, e.g. as they deliver a different committed service and/or because they are dedicated to a customer, in which case such Network Slices may be of the same Slice/Service Type but are distinguished through different Slice Differentiators.

The network may serve a single UE with one or more Network Slice instances simultaneously via a 5G-AN and associated with at most eight different S-NSSAIs in total, regardless of the access type(s) over which the UE is registered (e.g., 3GPP Access and/or N3GPP Access). The AMF instance serving the UE logically belongs to each of the Network Slice instances serving the UE, e.g., this AMF instance is common to the Network Slice instances serving a UE.

Identification and Selection of a Network Slice: S-NSSAI and NSSAI

A network slice is identified by an S-NSSAI, which includes a Slice/Service type (SST) and a Slice Differentiator (SD). The Slice/Service type (SST) refers to the expected Network Slice behavior in terms of features and services. The SD refers to is optional information that complements the Slice/Service type(s) to differentiate amongst multiple Network Slices of the same Slice/Service type.

An S-NSSAI can have standard values (e.g., such S-NSSAI is only comprised of an SST with a standardized SST value, and no SD) or non-standard values (e.g., such S-NSSAI is comprised of either both an SST and an SD or only an SST without a standardized SST value and no SD). An S-NSSAI with a non-standard value identifies a single Network Slice within the PLMN with which it is associated. An S-NSSAI with a non-standard value shall not be used by the UE in access stratum procedures in any PLMN other than the one to which the S-NSSAI is associated. Table 2 shows the standardized SST values.

An NSSAI is a collection of S-NSSAIs. An NSSAI may be a Configured NSSAI, a Requested NSSAI or an Allowed NSSAI. There can be at most eight S-NSSAIs in Allowed and Requested NSSAI sent in signaling messages between the UE and the Network. The Requested NSSAI signaled by the UE to the network allows the network to select the Serving AMF, Network Slice(s) and Network Slice instance(s) for this UE.

Based on the operator's operational or deployment needs, a Network Slice instance can be associated with one or more S-NSSAIs, and an S-NSSAI can be associated with one or more Network Slice instances. Multiple Network Slice instances associated with the same S-NSSAI may be deployed in the same or in different Tracking Areas. When multiple Network Slice instances associated with the same S-NSSAI are deployed in the same Tracking Areas, the AMF instance serving the UE may logically belong to (e.g., be common to) more than one Network Slice instance associated with this S-NSSAI.

Based on the Requested NSSAI (if any) and the Subscription Information, the 5GC is responsible for selection of a Network Slice instance(s) to serve a UE including the 5GC Control Plane and User Plane Network Functions corresponding to this Network Slice instance(s).

The (R)AN may use Requested NSSAI in access stratum signaling to handle the UE Control Plane connection before the 5GC informs the (R)AN of the Allowed NSSAI. The Requested NSSAI is used by the RAN for AMF selection, as described in clause 6.3.5 of TS 23.501. The UE shall not include the Requested NSSAI in the RRC Resume when the UE asks to resume the RRC connection and is CM-CONNECTED with RRC Inactive state.

When a UE is successfully registered over an Access Type, the CN informs the (R)AN by providing the Allowed NSSAI for the corresponding Access Type.

Standardized SST values provide a way for establishing global interoperability for slicing so that PLMNs can support the roaming use case more efficiently for the most commonly used Slice/Service Types. The SSTs which are standardized are in Table 2 of the Appendix Configured NSSAI Configured NSSAI is the NSSAI provisioned in the UE applicable to one or more PLMNs. A Configured NSSAI may be configured by a Serving PLMN and apply to the Serving PLMN. There is at most one Configured NSSAI per PLMN.

Default Configured NSSAI

A Default Configured NSSAI is configured by the HPLMN and it applies to any PLMNs for which no specific Configured NSSAI has been provided to the UE. The value(s) used in the Default Configured NSSAI are expected to be commonly decided by all roaming partners. The Default Configured NSSAI, if it is configured in the UE, is used by the UE in a Serving PLMN only if the UE has no Configured NSSAI for the Serving PLMN. The UE may be pre-configured with the Default Configured NSSAI.

Requested NSSAI

The Requested NSSAI is the NSSAI provided by the UE to the Serving PLMN during registration. The S-NSSAIs in the Requested NSSAI are selected from the Configured NSSAI that is applicable for this PLMN, when it is available. If no Configured NSSAI for the PLMN is available, the S-NSSAIs in the Requested NSSAI are selected from the Default Configured NSSAI, if configured in the UE.

The Requested NSSAI signaled by the UE to the network allows the network to select the Serving AMF, Network Slice(s) and Network Slice instance(s) for this UE. Based on the Requested NSSAI (if any) and the Subscription Information, the 5GC is responsible for selection of a Network Slice instance(s) to serve a UE including the 5GC Control Plane and User Plane Network Functions corresponding to this Network Slice instance(s).

Allowed NSSAI

Allowed NSSAI is the NSSAI provided to the UE by the Serving PLMN during a Registration procedure, indicating the S-NSSAIs values the UE is registered to in the Serving PLMN for the current Registration Area. Upon successful completion of a UE Registration procedure over an Access Type, the UE obtains from the AMF an Allowed NSSAI for this Access Type, which includes one or more S-NSSAIs and, if needed), their mapping to the HPLMN S-NSSAIs. These S-NSSAIs are valid for the current Registration Area and Access Type and can be used simultaneously by the UE.

Mapping of Allowed NSSAI

The Mapping of Allowed NSSAI is the mapping of each S-NSSAI of the Allowed NSSAI for the Serving PLMN to the HPLMN S-NSSAIs.

Mapping of Configured NSSAI

The Mapping of Configured NSSAI is the mapping of each S-NSSAI of the Configured NSSAI for the Serving PLMN to the HPLMN S-NSSAIs.

S-NSSAI Encoding

Figure 2:
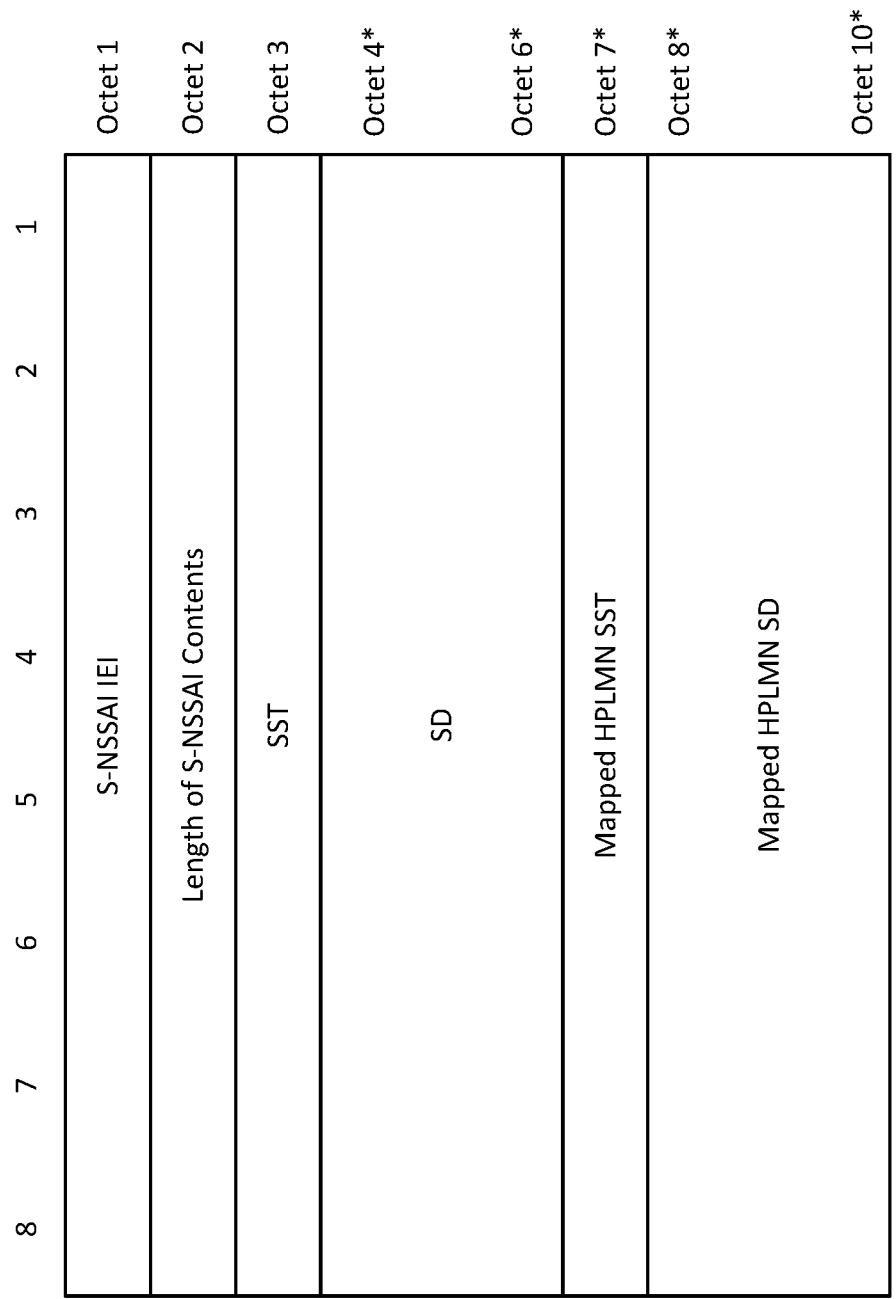
FIG. 2 illustrates an example S-NSSAI information element.

The purpose of the S-NSSAI information element is to identify a network slice. The S-NSSAI information element is coded as shown in FIG. 2 and in Table 3 of the Appendix, as described in 9.11.2.8 of TS 24.501.

The S-NSSAI is a type 4 information element with a minimum length of 3 octets and a maximum length of 10 octets.

Accessing PLMN Services Via an SNPN and Accessing SNPN Services Via a PLMN

Figure 3:
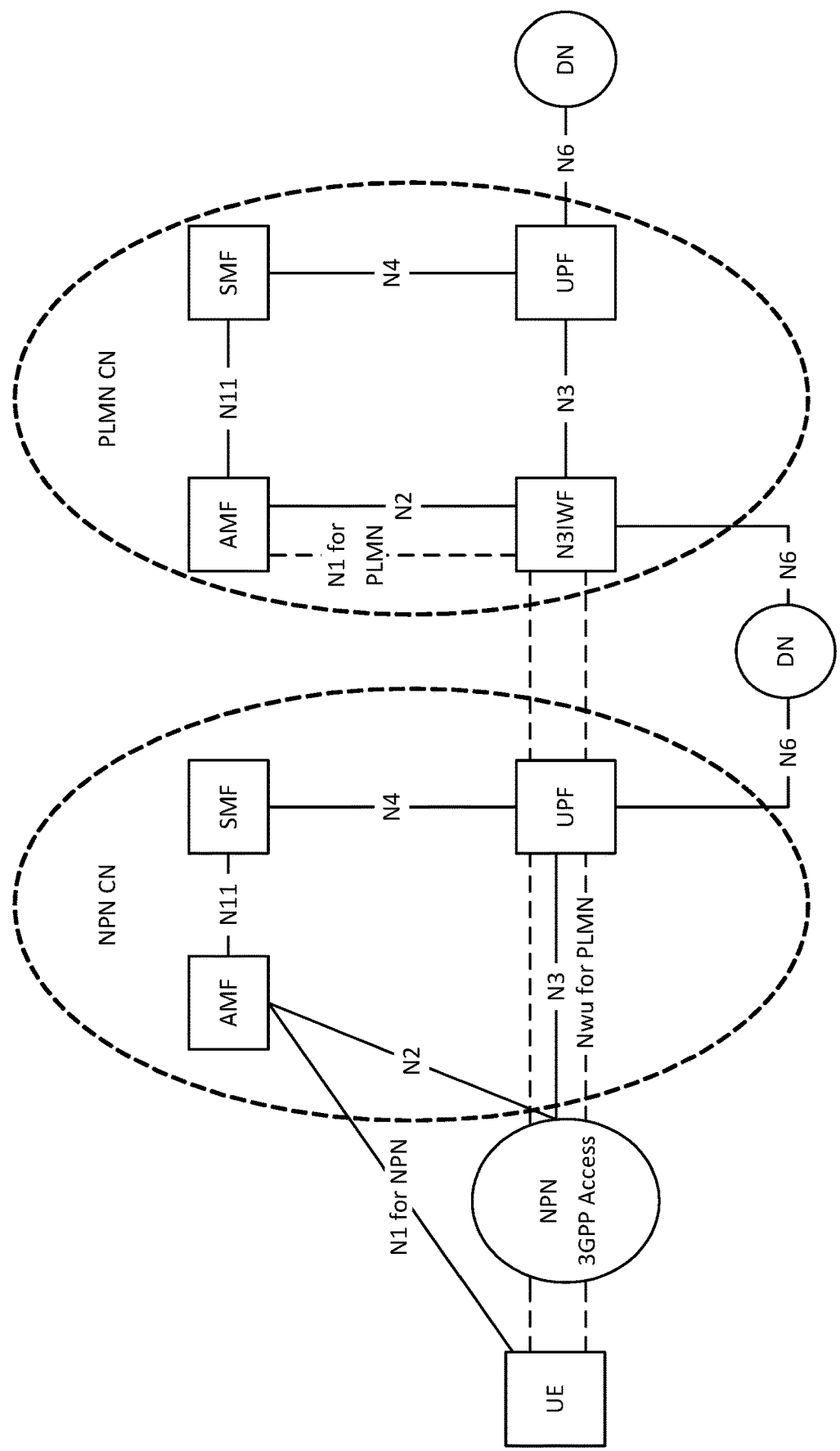
FIG. 3 is a block diagram illustrating an example of access to PLMN services via a stand-alone non-public network.

As described in TS 23.501, Annex D.3, a UE can use its NPN connection to access the services of PLMN. In order to obtain access to PLMN services when the UE is camping in NG-RAN of Stand-alone Non-Public Network, the UE obtains IP connectivity, discovers and establishes connectivity to an N3IWF in the PLMN. This is illustrated in FIG. 3, which is copied from TS 23.501, Annex D.3.

Figure 4:
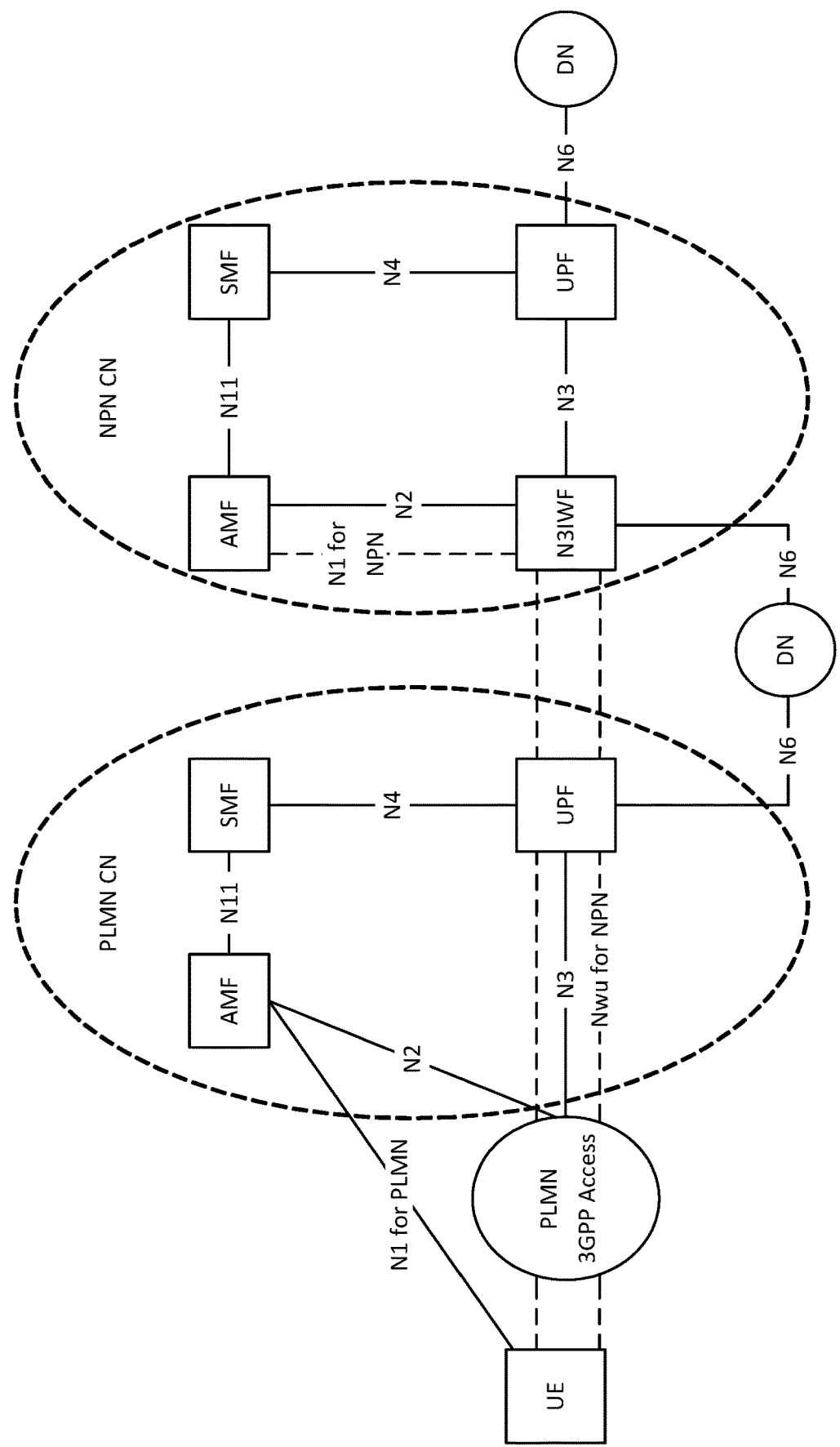
FIG. 4 is a block diagram illustrating an example of access to stand-alone non-public network services via PLMN.

As described in TS 23.501, Annex D.3, a UE can use its PLMN connection to access the services of an SNPN. In order to obtain access to Non-Public Network services when the UE is camping in NG-RAN of a PLMN, the UE obtains IP connectivity, discovers and establishes connectivity to an N3IWF in the Stand-alone Non-Public Network. This is illustrated in FIG. 4 which is copied from TS 23.501, Annex D.3.

Example Challenges

TR 22.821 describes a use case where a user, Grace, is responsible for installing networked devices in a new production line at a factory. She needs to unpack, configure, install, and test devices, and work with her colleagues to get the production process running smoothly. Grace's devices include sensors, actuators, and controllers that communicate using a 5G LAN service. In this deployment, her factory owns and deploys a private network using 3GPP technology, and serves as the network operator. Grace uses tools to securely configure devices for service on the factory 5G LAN system. This use case leads to a requirement that the 5G system needs to support secure mechanism for an operator to provision 3GPP credentials to industrial IoT devices for 5G LAN-type services.

TR 23.700-7 describes a key issue on UE Onboarding and remote provisioning. An important aspect of the key issue is to consider how does the 5G system provide and update the subscription of an authorized UE in order to allow the UE to request connectivity to a desired NPN. An objective of the key issue is to study how the UE discovers and selects the NPN before UE subscription is provisioned. The key issue will also consider how the network authenticates the UE before the UE's subscription is provisioned and, once the UE is authenticated, how to remotely provision the required new or updated information to the UE for enabling the UE to access the NPN using 5GS. Solutions to this problem should define what triggers the onboarding procedure and solutions should consider the fact that the UE might not have a UICC and that the TE might not have an interface that can be used to provision the MT.

In some scenarios, the information that is broadcasted by the O-SNPN may not be sufficient for the UE to determine that the O-SNPN is a network that can onboard the UE. This paper describes how the UE can detect that the network is not a network that can onboard the UE and how the UE can determine what network it should try to contact next for onboarding. For example, scenarios may arise where the UE attempts to perform an onboarding operation with the wrong network. Thus, procedures are needed that allow the UE to verify whether it has connected to the correct network and, in the scenario where the UE determines that it has not connected to the correct network, procedures are needed to allow the UE to determine another network to connect to. Determining the correct network requires a procedure that allows the UE to authenticate the network. Thus, onboarding procedures need to allow the network and UE to authenticate each other in order to avoid situations where malicious UEs connect to valid networks or valid UEs connect to malicious networks.

Some devices might have a subscription in NPN(s) and a subscription with an MNO. In such a scenario, the procedures of TS 23.501, Annex D.3, may be used to access the services of the SNPN via the PLMN and the services of the PLMN via the SNPN. However, in other scenarios, it may not be possible to obtain an IP connection between the IP (e.g., N6) network of the PLMN and the IP (e.g., N6) network of the SNPN. In such a scenario, some of the services that are offered by the slices of the SNPN may also be offered by the slices of the MNO's PLMN. In scenarios where some of the same services are available in both the SNPN and the MNO's PLMN, the 5G system needs to be enhanced to support both seamless service continuity for subscribed PLMN services between a non-public network and a PLMN and seamless service continuity for non-public network services between a non-public network and a PLMN. In order to support service continuity between an NPN and PLMN, the UE needs to be configured with information so that it knows how slices of the NPN map to slices of the PLMN. Currently no such mechanism exists in the 5G system. A similar issue, which is described in TR 23.700-07, is how to support service continuity between SNPNs. This involves enabling an authorized UE to be able to efficiently select equivalent SNPNs during network selection and to be able to efficiently access and move between equivalent SNPNs. Currently, when a UE is registered in a PLMN, the AMF may provide a List of equivalent PLMNs which is handled as specified in TS 24.501. However, for a UE registered in an SNPN, the AMF shall not provide a list of equivalent PLMNs to the UE. The 5G System needs to be enhanced to configure the UE with information to enable it to move between equivalent SNPNs and to know how slices of one NPN map to slices of another NPN.

Example Solutions

This paper proposes an onboarding procedure that a UE may be used to obtain SNPN credentials from a network and proposes procedures that can be used by the UE to indicate to a first network (e.g., a PLMN) what services that it would like to obtain from the first network that the UE normally obtains from a second network (e.g., SNPN).

Onboarding

As described above, a UE that operates in SNPN mode performs automatic network selection or manual network selection. It is proposed that when a UE is in SNPN mode which has no SNPN credentials, operates in a new, third mode, called Onboarding Mode. For onboarding mode, the UE selects and attempts to register with a RAN node that is broadcasting in the SIB or the MIB, an indication that the network supports UE onboarding. Alternatively, the presence of a particular SIB in a base station's broadcast information may serve as an indication to the UE that the network supports UE onboarding. The RAN node may additionally broadcast Onboarding Capability information which provides the UE with information about the network's onboarding capabilities. For example, Onboarding Capability Information (OCI) may indicate the following information.

First, types of devices (e.g., UE types) that the network can onboard. One example of a device capability is a control-plane only type device (e.g., a UE that only sends and receives data over the control plane using a NAS Transport).

Second, what credential types the network authenticate,

Third, if the network can authenticate devices from certain manufacturers then manufacturer identifiers may be broadcasted, Fourth, if the network can authenticate devices that are associated with certain AAA servers then manufacturer AAA server identifier may be broadcasted.

Fifth, a special CAG Identifier that is provisioned on the UE and indicates to the UE that the UE can be onboarded.

Sixth, Other information such as support for onboarding of UE with no credentials, UE with only manufacturer information (e.g. model, serial numbers, etc.), UE with device only (e.g. via manufacturer) credentials, UE with credentials for authentication with AAA servers, UE with eSIM capability, etc. In addition, the OCI may include the types of network slices (e.g. SST) the network supports to help the UE determine if the network offers the required slices for the UE.

Seventh, the network may broadcast indication that it has been provisioned with certain information found on the device packaging that is provided to the network, e.g. via an Application Function or Server, and is broadcasting an invitation code that the device is searching for over a certain frequency that the device is monitoring on.

Eighth, the network may broadcast indications of what authentication, authorization, and onboarding procedures are supported by the network. Examples of onboarding procedures are Control Plane (NAS) Based Onboarding, User Plane Based Onboarding, Onboarding during the Secondary authorization/authentication by an DN-AAA server during the PDU Session establishment procedure, and Onboarding during the Network Slice-Specific Authentication and Authorization procedure.

OCI may be broadcasted by the network in broadcast on-demand fashion (e.g., per UE request).

When a UE is operating in Onboarding Mode, the UE will check for a RAN node that is broadcasting an Onboarding Support Indicator (OSI). Hereinafter in this document, onboarding support indicator may be understood as an explicit indicator included in a system information to indicate support for Onboarding by a given RAN node, or alternatively the onboarding support indicator may be understood as the presence of a particular SIB in a base station's broadcast system information message. If a RAN node is broadcasting an Onboarding Support indicator, the UE will read the OCI The UE will check if the information in the OCI is aligned with the type of network that the UE needs to onboard with. Additionally, the UE may be provisioned with credentials, or certificates, that the UE can use to authenticate the SNPN. The UE may consider the information in the OCI to be aligned if the UE is provisioned to search and connect to a network that broadcasts certain values in the OCI. For example, a UE might be provisioned to discover and attempt to connect to a network that broadcasts an indication that it can onboard devices from certain manufacturers. If the OCI is aligned (e.g., it does match some of the information that is provisioned in the UE), the UE will send a Registration Request, or an Onboarding Request, to the network. The Registration Request may include the following information.

First, a PEI (e.g. a manufacturing identifier, serial number, etc.).

Second, an Onboarding Credential if available.

Third, an Onboarding Credential Type Indication (e.g. an indication of the certificate type).

Fourth, a manufacturer ID, device model and serial numbers, and other device related information Fifth, a AAA Server Identifier Sixth, an indication that the UE needs to be onboarded Seventh, a CAG identifier Eight, an identifier that can be used to identify the UE for charging purposes.

Ninth, A domain identifier which is associated with the provisioning server (e.g., the provisioning server of the manufacturer).

Tenth, an indication of what authentication, authorization, and onboarding procedures are supported by the device.

Eleventh, an indication of the device capabilities (e.g., if the device is a control plane only device).

Twelfth, an indication that the UE wants to authenticate the network and that the network should provide a response where at least part of the response is encrypted with a key that is expected to be provisioned in both the network and the UE The information above might be included in either or both the NAS Registration Request and the RRC Establishment Request. The UE might include the same information in both requests because the NAS Registration request might be encrypted with the Onboarding Credential and it may be desirable to make some of the above information visible to the RAN node. For example, the RAN node may use the manufacturer ID to select an AMF that can be used to authenticate devices from the indicated manufacturer. For example, the RAN node may use the AAA Server ID to select an AMF that can be used to authenticate devices that are associated with the identified AAA server. For example, the RAN node may use the credential type to select an AMF that can be used to authenticate devices that are associated with the identified credential type.

During the registration Procedure, the network (e.g., AMF and AUSF) may use the UE's Onboarding Credential to authenticate the UE as it would normally authenticate a UE during registration. The network may then send SNPN credentials to the UE. SNPN credentials may include the following information.

First, a SUPI that may be used for communicating with the SNPN.

Second, an SNPN Identity

Third, an Allowed CAG List that the UE is associated with.

Fourth, a CAG only indication.

Fifth, any information necessary for the UE to establish a tunnel between UE and an N3IWF of the NPN via the PLMN.

The network may choose any of the following options to send the SNPN credentials to the UE.

First, the network may send the credentials to the UE in the registration Response or Reject message.

Second, during registration the network may send the UE a URSP rule that directs all traffic towards a AAA server or directs all authentication requests towards a AAA server and all other traffic towards a null destination where the traffic will not be processed. The UE may then communicate with the AAA Server and download the SNPN credentials. The URSP rule may be based on information that was received from the UE in the Registration Request. For example, the Registration Request may have included a domain identifier(s) for provisioning server(s). The URSP rule may cause the UE to direct all traffic that is associated with a particular domain towards a certain S-NSSAI/DNN/IP Address/Port Number combination. Thus, causing all traffic to be routed to the AAA server that is associated with the domain identifier.

Figure 5:
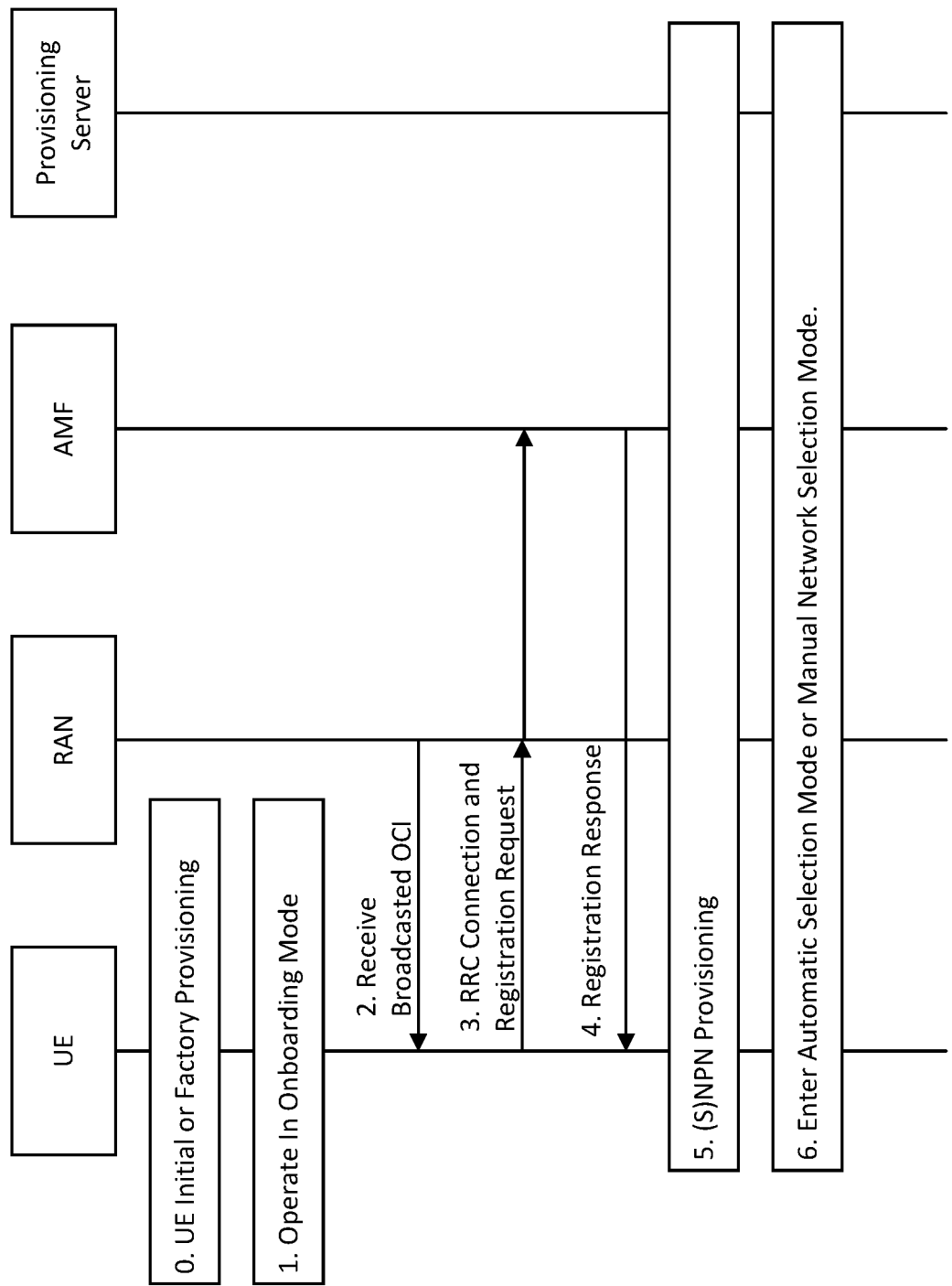
FIG. 5 is call flow diagram of an example onboarding procedure.

FIG. 5 shows an example of a procedure that may be used to onboard the UE.

In step 0, the UE is provisioned with onboarding credentials and OCI information. The UE uses the OCI to search for networks when in Onboarding mode.

In step 1, the UE is placed in onboarding mode. This may be done by turning the UE on, resetting UE, initiating onboarding mode with a button or GUI, etc. The UE may atomically enter onboarding mode when it is turned on and it has only onboarding credentials.

In step 2, the UE receives the OCI that is broadcasted by the RAN

In step 3, the UE sends an RRC Connection Request and Registration Request to the network. Both the RRC Connection Request and Registration Request may include information such as the UE's PEI, onboarding credential, etc. The RAN node will perform AMF selection and forward the Registration Request to the AMF. The information in the RRC Connection Request (e.g. the UE's PEI, onboarding credential, onboarding indication, etc.) are used to detect that the UE is connecting for onboarding and this information is considered by the RAN Node during AMF Selection.

In step 4, the AMF will send a Registration Response to the UE. The registration response may include the UE' SNPN credentials or URSP Rules that relate to the UE's onboarding traffic.

Furthermore, when the UE indicates to the network that a Registration Request is for UE Onboarding, the network may initiate the Network Slice-Specific Authentication and Authorization procedure that is described in TS 23.502, section 4.2.9.2. (Indication to the network that a Registration Request is for UE Onboarding may be done via an explicit indication in the Registration Request or by including a dedicated S-NSSAI that indicates onboarding in the registration request). The Network Slice-Specific Authentication and Authorization procedure may be used to authenticate and authorize the UE for onboarding. Additionally, the procedure may be used to onboard the UE (e.g., Network Credentials can be provided to the UE in the Network Slice-Specific Authentication and Authorization procedure that is described in TS 23.502, section 4.2.9.2). The credentials may be provided to the UE as part of an EAP Request/Response message or as part of the EAP Success Message which are carried in a NAS MM Transport message In step 5, the UE may initiate an application layer procedure in order to download SNPN Credentials from a server (e.g., a AAA Server). The URSP rules that were downloaded in step 4 may be used to direct the application layer traffic to the server.

The application layer traffic requires a PDU Session. Thus, a PDU Session must be established prior to any application layer traffic being generated. The PDU Session Establishment request may trigger the Secondary authorization/authentication by an DN-AAA server during the PDU Session establishment procedure. This procedure may be used to authenticate and authorize the UE for onboarding. Normally, the network would know to trigger the Secondary authorization/authentication by an DN-AAA server during the PDU Session establishment procedure when a certain DNN is detected in the PDU Session Establishment Request. Since it might not be possible to pre-provision a UE with DNN(s) prior to the initial onboarding operation, the PDU Session Establishment Request may be enhanced to allow the UE to include an onboarding indication in the PDU Session Establishment Request. Additionally, the procedure may be used to onboard the UE (e.g., Network Credentials can be provided to the UE in the EAP based secondary authentication by an external DN-AAA server procedure which is defined in TS 33.501 section 11.1.1). The credentials may be provided to the UE as part of an EAP Request/Response message or as part of the EAP Success Message that is carried in the PDU Session Establishment Accept message or as part of the PCO or as part of an onboarding policy.

In step 6, the UE will Enter Automatic Selection Mode or Manual Network Selection Mode and attempt to use the SNPN credentials to connect to the SNPN.

Authentication Based Network Detection

When the UE sends a registration request to an O-SNPN, the UE needs to check that it is connecting to the correct network and the network needs to verify that the UE is a UE that the network should onboard. If the network determines that the UE is a UE that the network should onboard, then the network needs to additionally determine what information and credentials it should provision (e.g., onboard) to the UE.

The UE may come with initial information. Initial Information may be provisioned in the UE during the manufacturing process. Initial information may include an initial ID, device key, and network key. The initial information may be provided on a device label or with the device packaging. The network may expose an API that allows a network administrator to provide the initial information to the network. When the UE sends a Registration Request to the network (e.g., as shown in step 3 of FIG. 5), the contents of the NAS Registration Request may be encrypted with the device key and the initial ID may be sent "in the clear" (e.g., not encrypted). The network may consider the device to be authenticated if the network is able to decrypt the NAS Registration Request with the device key that was provided by the API.

If the network is able to authenticate the UE, then the network may send a registration response (e.g., as shown in step 4 of FIG. 5) that is encrypted with the network key that was provided by the API. The UE may consider the network to be authentic if UE is able to decrypt the NAS Registration Response with the network key that was provisioned on the device during manufacturing. After Authenticating the network, the UE may proceed with the onboarding process (e.g., as shown in FIG. 5).

If the network is not able to authenticate the UE, in other words, if the network is not able to decrypt the Registration Request or does not recognize the device identifier, then the network may send a registration reject to the UE. The following section describe what information the network may send to the UE in order to indicate to the UE that the network is not able to onboard the UE and help the UE determine a new network to attempt to onboard with.

As described above, the Network Slice-Specific Authentication and Authorization procedure that is described in TS 23.502, section 4.2.9.2 or the Secondary authorization/authentication by an DN-AAA server during the PDU Session establishment procedure that is described in TS 33.501 section 11.1.1 may be used to authenticate the UE and to determine if the UE has connected to a proper O-SNPN. These 2 procedures may be updated so that the EAP interaction between the UE and the DN-AAA or AAA-S is a mutual authentication procedure between the UE and DN-AAA or AAA-S that uses the Initial information as described earlier.

Handling the Case where the Wrong Network is Selected

In some scenarios, the information that is broadcasted by the O-SNPN may not be sufficient for the UE to determine that the O-SNPN is a network that can onboard the UE. This section describes how the UE can detect that the network is not a network that can onboard the UE and how the network can determine what network it should try to contact next for onboarding.

Detecting that the Selected O-SNPN is Incorrect

In step 3 of FIG. 5, when the UE attempts to register with the network, the AMF may detect that it is not able, or unwilling, to onboard the UE. In such a scenario, the AMF may send a registration reject message to the UE in step 4. The Registration Reject cause code may indicate to the UE that the network is not able, or unwilling, to onboard the UE. The cause code may further indicate why the network is not able, or unwilling, to onboard the UE. For example, the cause code may indicate:

First, that the UE's identifier is not recognized (e.g. a PEI, manufacturing identifier, serial number, etc. is not recognized)

Second, that the UE's Onboarding Credentials are not available in the network.

Third, that the Onboarding Credential Type Indication (e.g. an indication of the certificate type) that was provided in the registration request is not recognized.

Fourth, a manufacturer ID, device model and serial numbers, and other device related information is not recognized or not supported.

Fifth, the AAA Server Identifier that was provided in the Registration Request is not recognized or cannot be reached at this time.

Sixth, an indication that the network recognizes the UE's Identifier, but has determined that the UE has already been onboarded and should not need new credentials. Human interaction with a network administrator may be required to resolve this type of rejection.

Seventh, that the CAG Identifier(s) received from the NG-RAN are not part of the UE's Allowed CAG list.

Eighth, an indication that the network recognizes the UE's Identifier, but the account associated with the UE is not enabled (e.g., the charging system indicates that there are insufficient funds in the user's account). Human interaction with a network administrator may be required to resolve this type of rejection. Ninth, onboarding redirection information which indicates to the UE that the current network cannot, or is unwilling, to onboard the UE and provides the UE with information that is sufficient for discovering a network that is willing to onboard the UE. The onboarding redirection information may include the Onboarding Capability Information (OCI) that was described earlier.

Tenth, a back off timer to indicate how long the UE must wait before attempting to onboard with this same network again.

If the Network Slice-Specific Authentication and Authorization procedure is used to Authenticate the UE, Authorize the UE, and/or deliver credentials for accessing an SNPN to the UE, then the AAA-S may indicate to the UE any of the information described above as being part of a Registration Reject Cause code.

It may be the case that the UE and/or Network do not determine during the registration procedure that the network is not able to onboard the UE. Rather, the network may indicate to the UE that the UE is successfully registered to the network for onboarding only. The UE may interpret that the Registration Acceptance is for onboarding only due to the fact that the UE provided an onboarding indication in the Registration Request. Alternatively, or additionally, the network may indicate to the UE, in the Registration Accept message, that the Registration is for onboarding only. The Registration Accept message may provide the UE with an S-NSSAI and/or DNN that can be used for onboarding. For example, the URSP rules that are provided to the UE in the Registration Accept message may direct all traffic to an onboarding S-NSSAI and DNN combination. The Registration Accept Message may also include LADN Information (e.g., LADN Service Area Information and LADN DNN) and it may be understood that, since the Registration is for onboarding only, the LADN Information represents DNN(s) and Area(s) where the UE may establish a PDU Sessions and onboard. The network may provide the same S-NSSAI to the UE in an Allowed NSSAI. Alternatively, when the UE establishes a PDU Session, the UE may provide no S-NSSAI or DNN and may provide an onboarding indication. The network may associate the PDU Session with an onboarding S-NSSAI and DNN. The AMF may determine to associate the PDU Session with an onboarding S-NSSAI and DNN based on an indication that is received from the AMF or based on an onboarding indication that is received from the UE in the PDU Session Establishment request. The UE may then attempt to be onboarded by initiating application layer signaling. If the Secondary authorization/authentication by an DN-AAA server during the PDU Session establishment procedure is used to Authenticate the UE, Authorize the UE, and/or deliver credentials to the UE, then the DN-AAA may indicate to the UE any of the information described above as being part of a Registration Reject Cause code.

Once a PDU Session is established for onboarding, the UE and AAA Server (e.g. DN-AAA) may perform application layer operations in order to send UE credentials from the DN-AAA to the UE.

Determining which Network to Try

When the UE detects that multiple networks are broadcasting an indication that they support UE onboarding, the UE may select, at random, a network with which to attempt to execute an onboarding procedure. However, if the UE has previously attempted to onboard with one of the networks, the UE may consider the results of the previous onboarding attempt. For example, the UE may de-prioritize networks that it previously attempted to receive onboarding credentials from. When a network indicates to the UE that it is not able, or not willing, to execute an onboarding procedure with the UE, the network may provide a backoff timer to the UE. The UE may run a timer for the duration of the backoff timer value. The UE may not consider the network during network selection if the timer that is associated with the network is running. After the timer expires, the UE may consider the network again, but may still prioritize networks that have not previously rejected the UE's onboarding attempt. If the UE successfully completes an onboarding operation with a network, the UE may clear, or reset, all backoff timers that are associated with previous onboarding attempts. Alternatively, the UE may only clear, or reset, the backoff timers that are associated with networks for which it has since received credentials. For example, if a UE unsuccessfully attempts to perform an onboarding operation with Network A and later successfully completes an onboarding operation with Network B where Network B onboards the UE with credentials for Network A, then the UE may clear the backoff timer that is associated with Network A and may connect to Network A (e.g., for non-onboarding activity).

Figure 10:
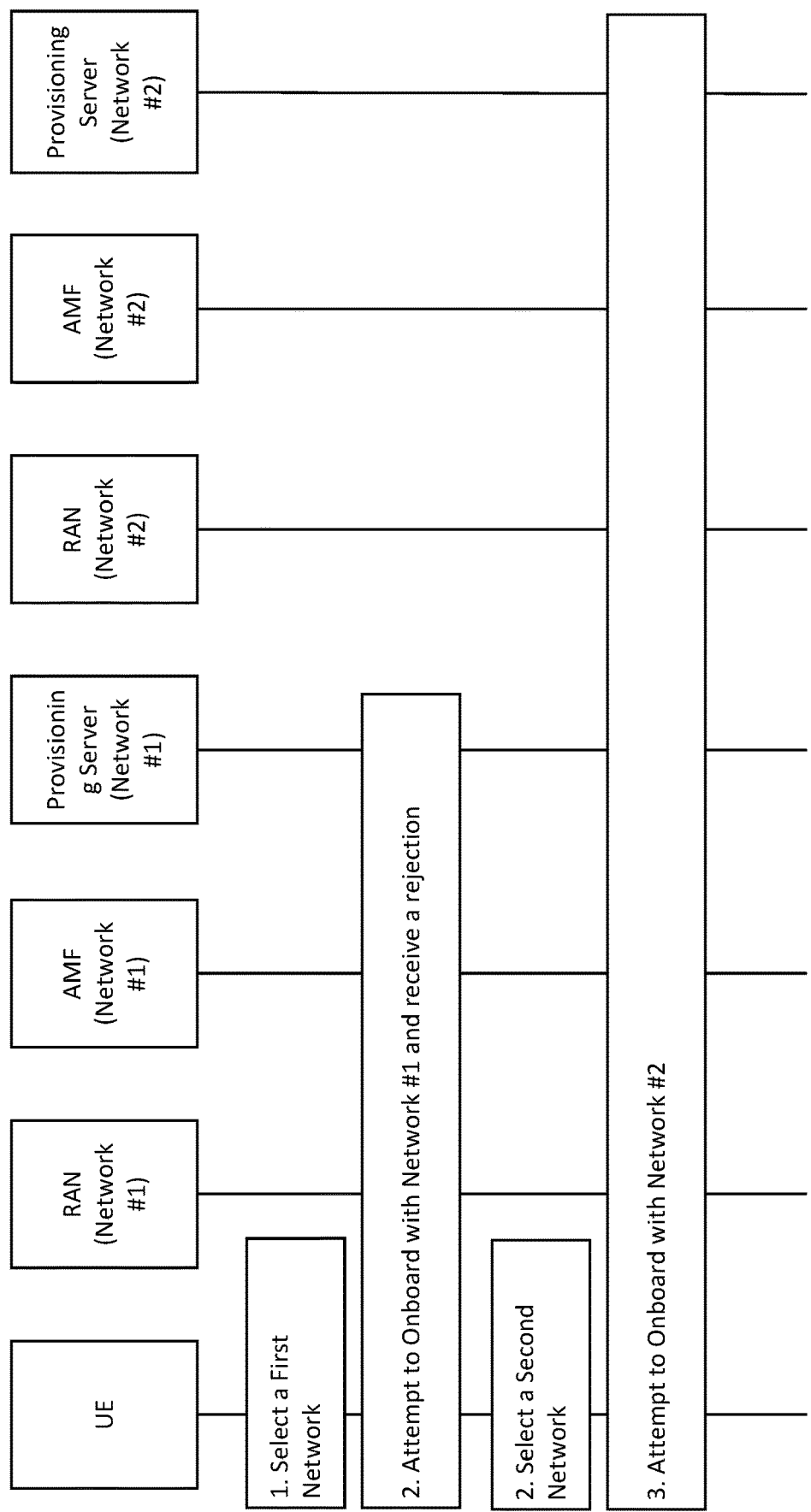
FIG. 10 is call flow diagram of an example onboarding procedure where the onboarding processes fails with a first network so the UE attempts to onboard with a second network.

FIG. 10 illustrates an example procedure where the UE attempts to execute an onboarding procedure with a first network, is rejected, and attempts to execute an onboarding procedure with a second network.

In step 1, the UE is in onboarding mode and performs network selection. Multiple networks are broadcasting an indication that they support onboarding, or the UE determines that multiple networks may be suitable for onboarding, so the UE randomly selects a first network to attempt an onboarding procedure with.

In step 2, the UE attempts to onboard with the first network and is rejected as described above. The network may provide the UE with a rejection cause and a backoff timer. The UE starts a back off timer and associates it with the first network.

In step 3, the UE re-enters onboarding mode and performs network selection again. This time, since the back off timer that is associated with first network is still running, the UE does not consider the first network for network selection. If the timer is no longer running, the UE may consider the first network to be low priority relative to other network who have not more recently reject the UE's onboarding request. The UE will then select a second network to attempt an onboarding procedure with.

In step 4, the UE attempts to onboard with the second network as described above and is successful.

Obtaining SNPN Services from a PLMN

As described above, when a UE registers to a PLMN it will receive a List of equivalent PLMNs from the network and when the UE registers to an SNPN, it will not receive a List of equivalent PLMNs from the network.

It may be the case that the UE can obtain services, which are equivalent to the services of the SNPN, from another SNPN or a PLMN. Thus, it is proposed that the network be able to send a List of equivalent PLMNs to the UE, even when the network is an SNPN. This list can consist of both PLMNs and SNPNs. However, the current format of the List of equivalent PLMNs information element, as defined in TS 24.008, should be enhanced such that the information element can also include SNPN Identities. Alternatively, the UE could be provided with separate lists (e.g., a List of equivalent PLMNs and a List of equivalent SNPNs). An example of a List of equivalent SNPNs is shown in FIG. 6. The SNPN list may consist of PLMN IDs and each PLMN ID may be followed by the NIDs, that for an Equivalent SNPN ID when combined with the associated PLMN ID. The network may indicate, to the UE, that all NIDs that are associated with a PLMN may be considered equivalent by populating an NID information element with a special value (e.g. all 0's or all 1's) or including no NID information elements after the PLMN information element.

When a UE requests services from a network, the UE indicates the services that it desires by providing a Requested NSSAI and a Mapping of Requested NSSAI in the Registration Request. The Mapping of Requested NSSAI indicates to the network how the slice names (S-NSSAIs) of the network map to the slice names (S-NSSAIs) of the UE's HPLMN. The Mapping of Requested NSSAI is formatted as illustrated in FIG. 2. From the description above, it can be seen that the current 5G system design is insufficient for the case where a UE wants to request services from a PLMN, and those services need to be equivalent to a slice (S-NSSAI) that is offered by an SNPN. The current 5G system design is insufficient because, when the UE registers to a VPLMN, the network uses the UE's IMSI to determine the UE's HPLMN and to determine how the slices of the VPLMN map to the slices of the HPLMN. There is no way for the UE to indicate to the network that a slice (S-NSSAI) in the Requested NSSAI is associated not with the UE's HPLMN but with an SNPN.

It is proposed that, for each slice (S-NSSAI) in the Requested NSSAI, the UE indicate if the slice is not associated with the UE's HPLMN. The S-NSSAI encoding that is shown in FIG. 7 and in Table 5 of the Appendix, may be used to indicate this information to the network. As can be seen in FIG. 7 and Table 5, the UE can indicate to the network that the S-NSSAI is associated with an SNPN and can also indicate to the network the network identity (SNPN Identity) that is associated with the S-NSSAI. In other words, the presence of the NPN ID in the IE indicates to the network that the slice is not associated with the UE's HPLMN.

It should be appreciated that FIG. 7 and Table 5 illustrate just one example of how this information can be conveyed to the UE. Alternatively, the network (e.g., the AMF) may send a NAS message to the UE to program the UE with information about how SNPN Identities or NIDs map into a smaller identify space. For example, the network may program the UE with information on how to map SNPN Identities or NIDs map to a single octet value. If the UE is provided with information on how to map NIDs map to a single octet value, then the S-NSSAI encoding would only need to be enhanced to carry the MCC, MNC and single octet encoding of the NID.

When the network receives this information from the UE in the Registration Requested and in the Requested NSSAI, the network can use this information to determine what Mapping of Requested NSSAI to send to the UE in the registration Response message. The Mapping of Requested NSSAI information element may also be enhanced as shown in FIG. 7 so that the network can indicate to the UE how the S-NSSAIs of the VPLMN map to the S-NSSAIs of the HPLMN and the S-NSSAIs of SNPNs that are associated with the UE. Alternatively, the network may provide the UE with multiple copies Mapping of Allowed NSSAI and Mapping of Configured NSSAI information elements and indicate whether each copy is associated with the UE's HPLMN or an SNPN.

Figure 8:
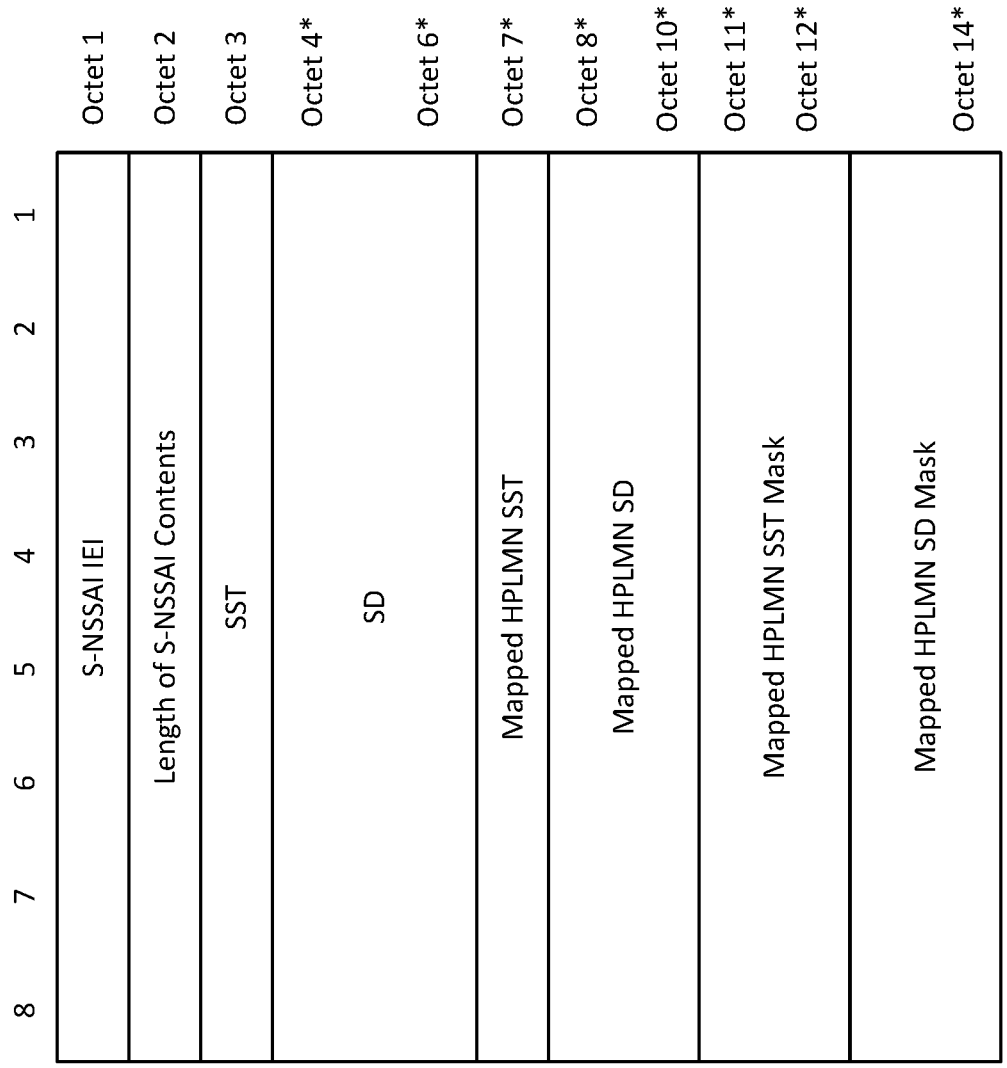
FIG. 8 illustrates an example S-NSSAI information element with SST Mask and SD Mask.

In some cases, the PLMN might not be able to provide the exact services that are offered by the SNPN. For example, the SNPN might provide access to an eMBB slice that allows the UE to surf the web and access services that are available in some private network. Such a slice might be identified by an eMBB SST Type and a special SD value. The PLMN might be able to provide the UE with access to a slice that can be used for surfing the web, but the same slice cannot be used to access the private network that is associated with the SNPN. Thus, it is proposed that the encoding of the NSSAI, which is described above, be enhanced to allow the network to indicate that the network can only partially map an S-NSSAI from the UEs subscription to a slice that is available in the PLMN. Such a partial indication may be used by the network to indicate to the UE that the network can provide the UE access to a slice with the same SST value but not the same SD value. Alternatively, the indication may indicate to the UE that only the SST value can be supported. Alternatively, in case certain bits of the SST or SD value indicated support of specific features to the UE, the encoding of the NSSAI may be enhanced to include a Bit Mask that is used to indicate to the UE which features of the S-NSSAI are supported in the PLMN and which are not supported in the PLMN. For example, a 1 may indicate that the feature that is indicated by the bit is supported and a 0 may indicate that the feature that is indicated by the bit is not supported. An example encoding is shown in FIG. 8 and in Table 4 of the Appendix.

Example Environments

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 9A:
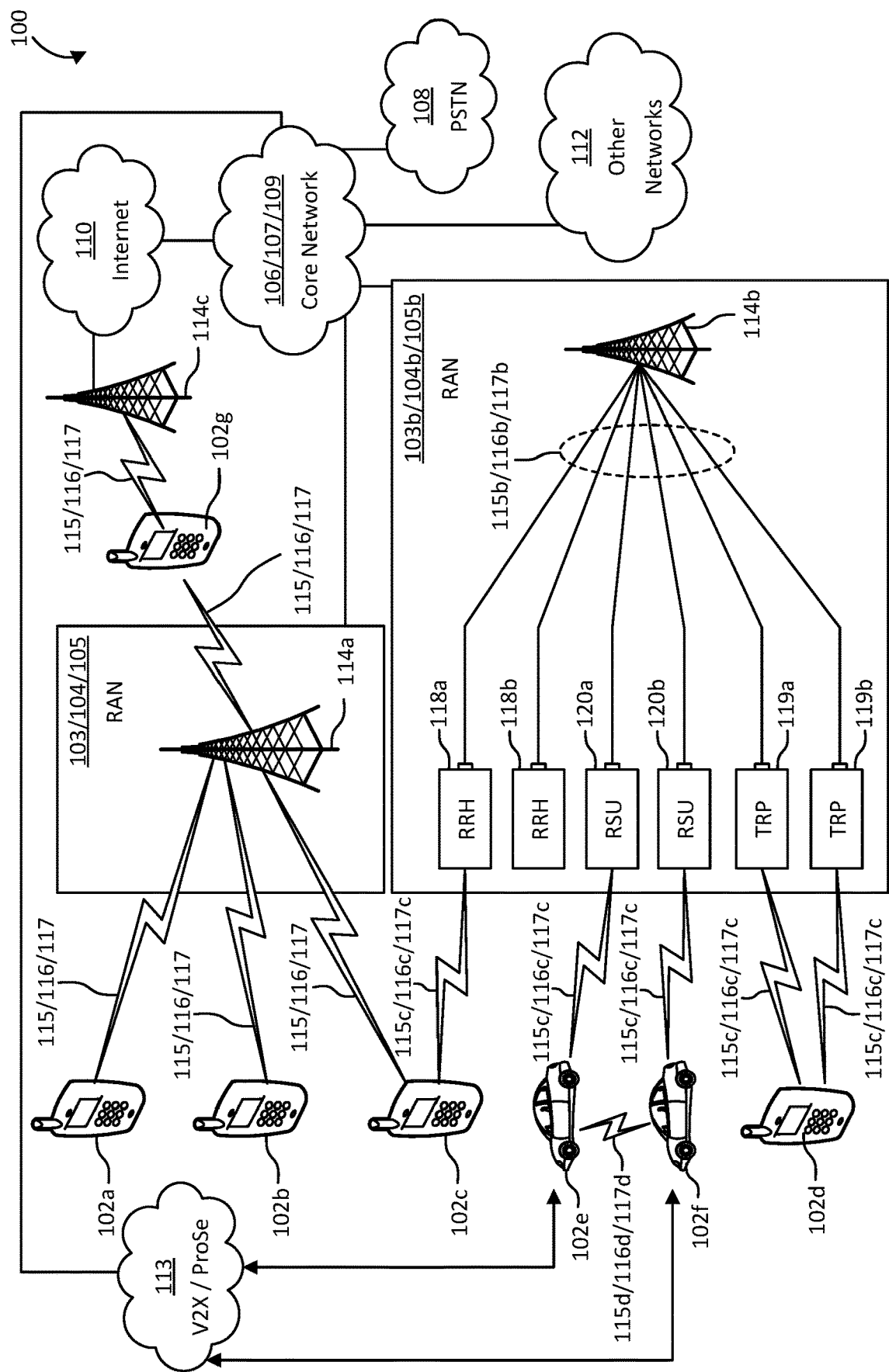
FIG. 9A illustrates an example communications system in which the methods and apparatuses described and claimed herein may be embodied.

FIG. 9A illustrates one embodiment of an example communications system 100 in which the methods and apparatuses described and claimed herein may be embodied. As shown, the example communications system 100 may include wireless transmit/receive units (WTRUs) 102a, 102b, 102c, 102d, 102e, 102f, and/or 102g (which generally or collectively may be referred to as WTRU 102), a radio access network (RAN) 103/104/105/103b/104b/105b, a core network 106/107/109, a public switched telephone network (PSTN) 108, the Internet 110, other networks 112, and V2X server (or ProSe function and server) 113, though it will be appreciated that the disclosed embodiments contemplate any number of WTRUs, base stations, networks, and/or network elements. Each of the WTRUs 102a, 102b, 102c, 102d, 102e, 102f, 102g may be any type of apparatus or device configured to operate and/or communicate in a wireless environment. Although each WTRU 102a, 102b, 102c, 102d, 102e, 102f, 102g is depicted in FIGS. 9A-9E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b, TRPs (Transmission and Reception Points) 119a, 119b, and/or RSUs (Roadside Units) 120a and 120b to facilitate access to one or more communication networks, such as the core network 106/107/109, the Internet 110, the other networks 112, and/or V2X server (or ProSe function and server) 113. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. RSUs 120a and 120b may be any type of device configured to wirelessly interface with at least one of the WTRU 102e or 102f, to facilitate access to one or more communication networks, such as the core network 106/107/109, the Internet 110, the other networks 112, and/or V2X server (or ProSe function and server) 113. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b, TRPs 119a, 119b, and/or RSUs 120a and 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b, TRPs 119a, 119b and/or RSUs 120a, 120b, may communicate with one or more of the WTRUs 102c, 102d, 102e, 102f over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

The WTRUs 102a, 102b, 102c, 102d, 102e, 102f, and/or 102g may communicate with one another over an air interface 115d/116d/117d (not shown in the figures), which may be any suitable wireless communication link (e.g., radio frequency (RF), microwave, infrared (IR), ultraviolet (UV), visible light, cmWave, mmWave, etc.). The air interface 115d/116d/117d may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and RSUs 120a, 120b, in the RAN 103b/104b/105b and the WTRUs 102c, 102d, 102e, 102f, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b, TRPs 119a, 119b, and/or RSUs 120a, 120b, in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology. The LTE and LTE-A technology includes LTE D2D and V2X technologies and interface (such as Sidelink communications, etc.) The 3GPP NR technology includes NR V2X technologies and interface (such as Sidelink communications, etc.)

In an embodiment, the base station 114a in the RAN 103/104/105 and the WTRUs 102a, 102b, 102c, or RRHs 118a, 118b, TRPs 119a, 119b and/or RSUs 120a, 120b, in the RAN 103b/104b/105b and the WTRUs 102c, 102d, 102e, 102f may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 9A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 9A, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 9A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS) The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 9A may be configured to communicate with the base station 114a, which may employ a cellular-based radio technology, and with the base station 114c, which may employ an IEEE 802 radio technology.

Figure 9B:
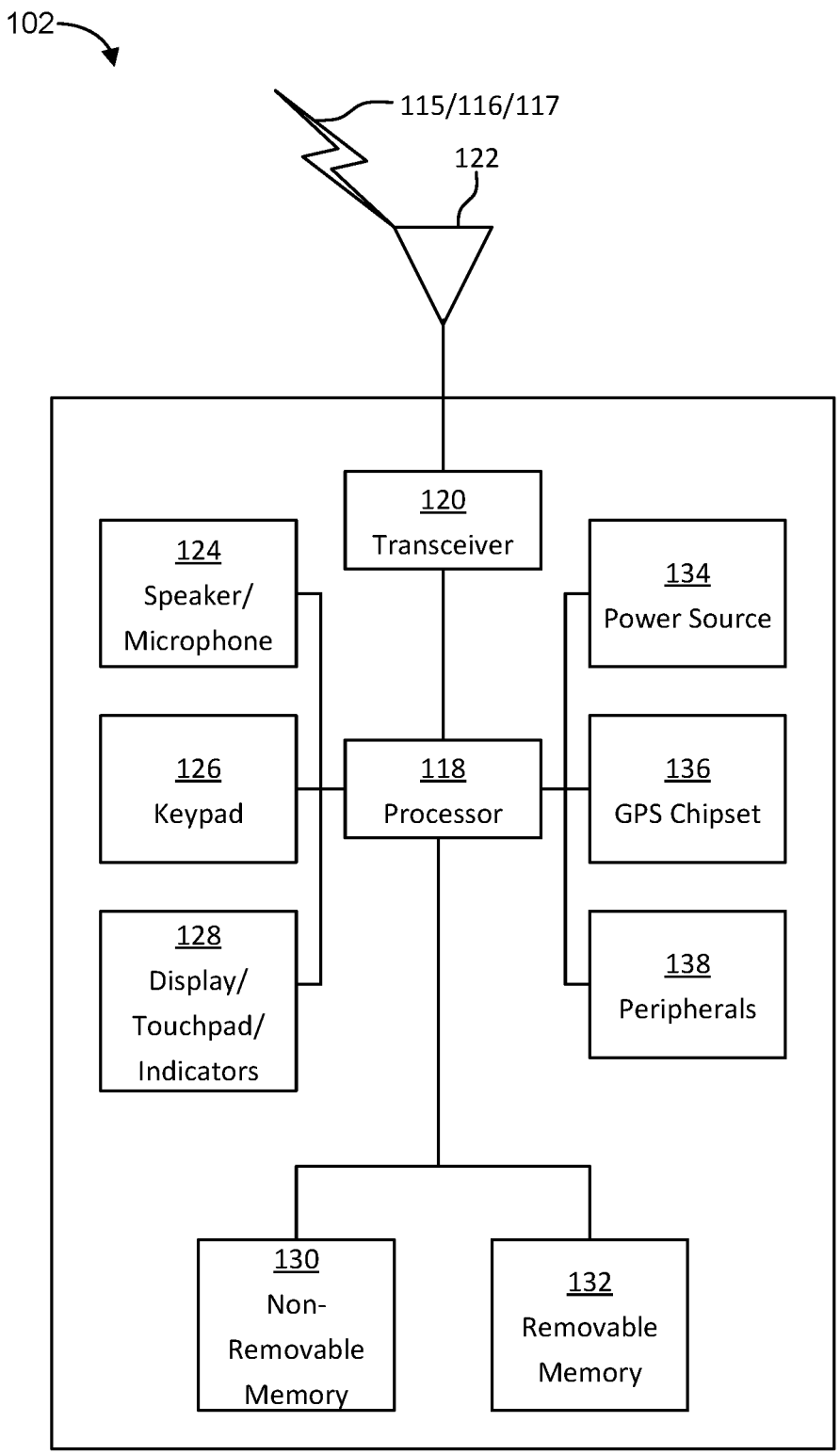
FIG. 9B is a block diagram of an example apparatus or device configured for wireless communications.

FIG. 9B is a block diagram of an example apparatus or device configured for wireless communications in accordance with the embodiments illustrated herein, such as for example, a WTRU 102. As shown in FIG. 9B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 9B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 9B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 9B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 9C:
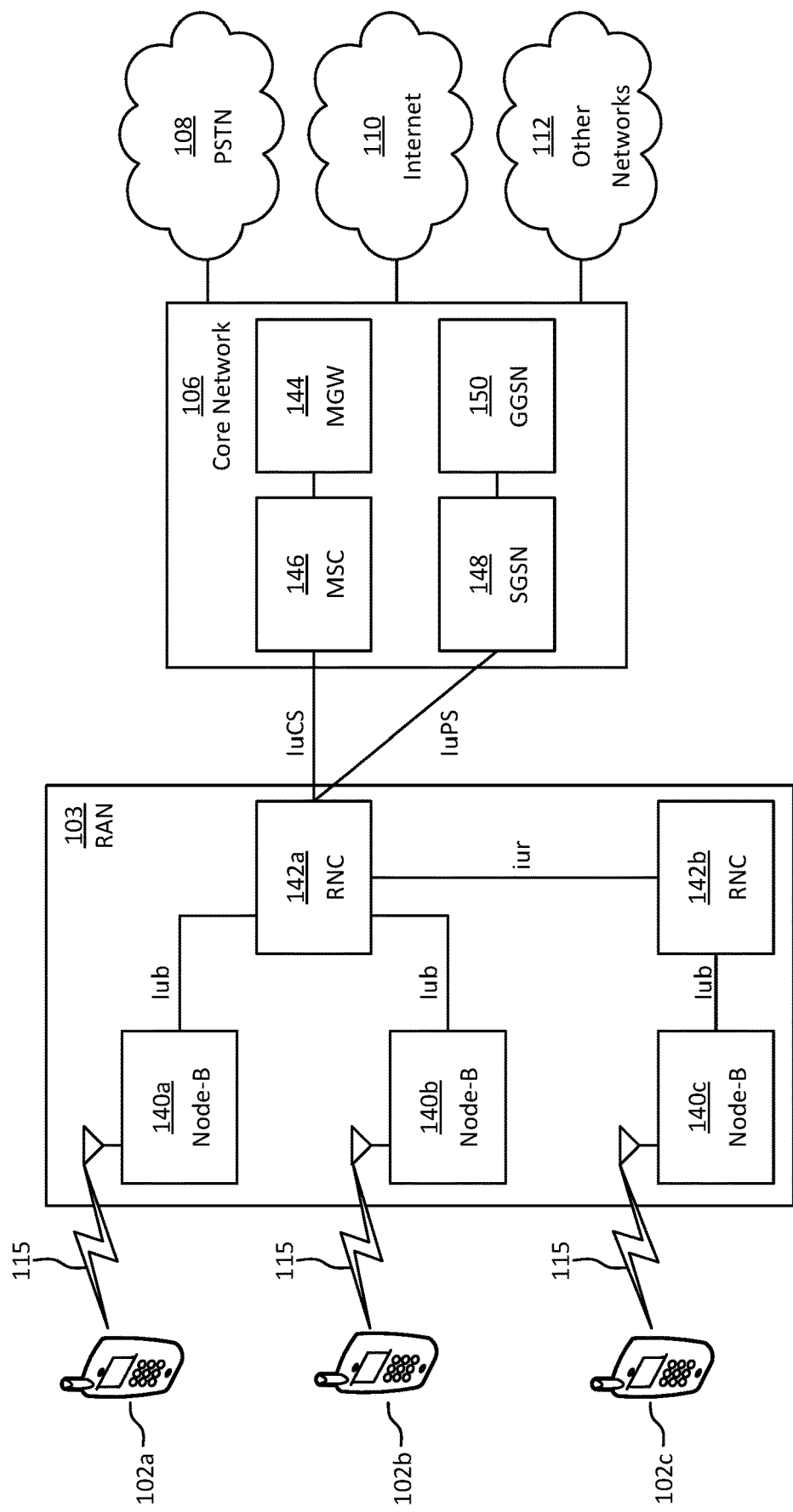
FIG. 9C is a system diagram of an example radio access network (RAN) and core network.

FIG. 9C is a system diagram of the RAN 103 and the core network 106 according to an embodiment. As noted above, the RAN 103 may employ a UTRA radio technology to communicate with the WTRUs 102*a*, 102*b*, and 102*c* over the air interface 115. The RAN 103 may also be in communication with the core network 106. As shown in FIG. 9C, the RAN 103 may include Node-Bs 140*a*, 140*b*, 140*c*, which may each include one or more transceivers for communicating with the WTRUs 102*a*, 102*b*, 102*c* over the air interface 115. The Node-Bs 140*a*, 140*b*, 140*c* may each be associated with a particular cell (not shown) within the RAN 103. The RAN 103 may also include RNCs 142*a*, 142*b*. It will be appreciated that the RAN 103 may include any number of Node-Bs and RNCs while remaining consistent with an embodiment.

As shown in FIG. 9C, the Node-Bs 140*a*, 140*b* may be in communication with the RNC 142*a*. Additionally, the Node-B 140*c* may be in communication with the RNC 142*b*. The Node-Bs 140*a*, 140*b*, 140*c* may communicate with the respective RNCs 142*a*, 142*b* via an Iub interface. The RNCs 142*a*, 142*b* may be in communication with one another via an Iur interface. Each of the RNCs 142*a*, 142*b* may be configured to control the respective Node-Bs 140*a*, 140*b*, 140*c* to which it is connected. In addition, each of the RNCs 142*a*, 142*b* may be configured to carry out or support other functionality, such as outer loop power control, load control, admission control, packet scheduling, handover control, macro-diversity, security functions, data encryption, and the like.

The core network 106 shown in FIG. 9C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142*a* in the RAN 103 may be connected to the MSC 146 in the core network 106 via an IuCS interface. The MSC 146 may be connected to the MGW 144. The MSC 146 and the MGW 144 may provide the WTRUs 102*a*, 102*b*, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 9D:
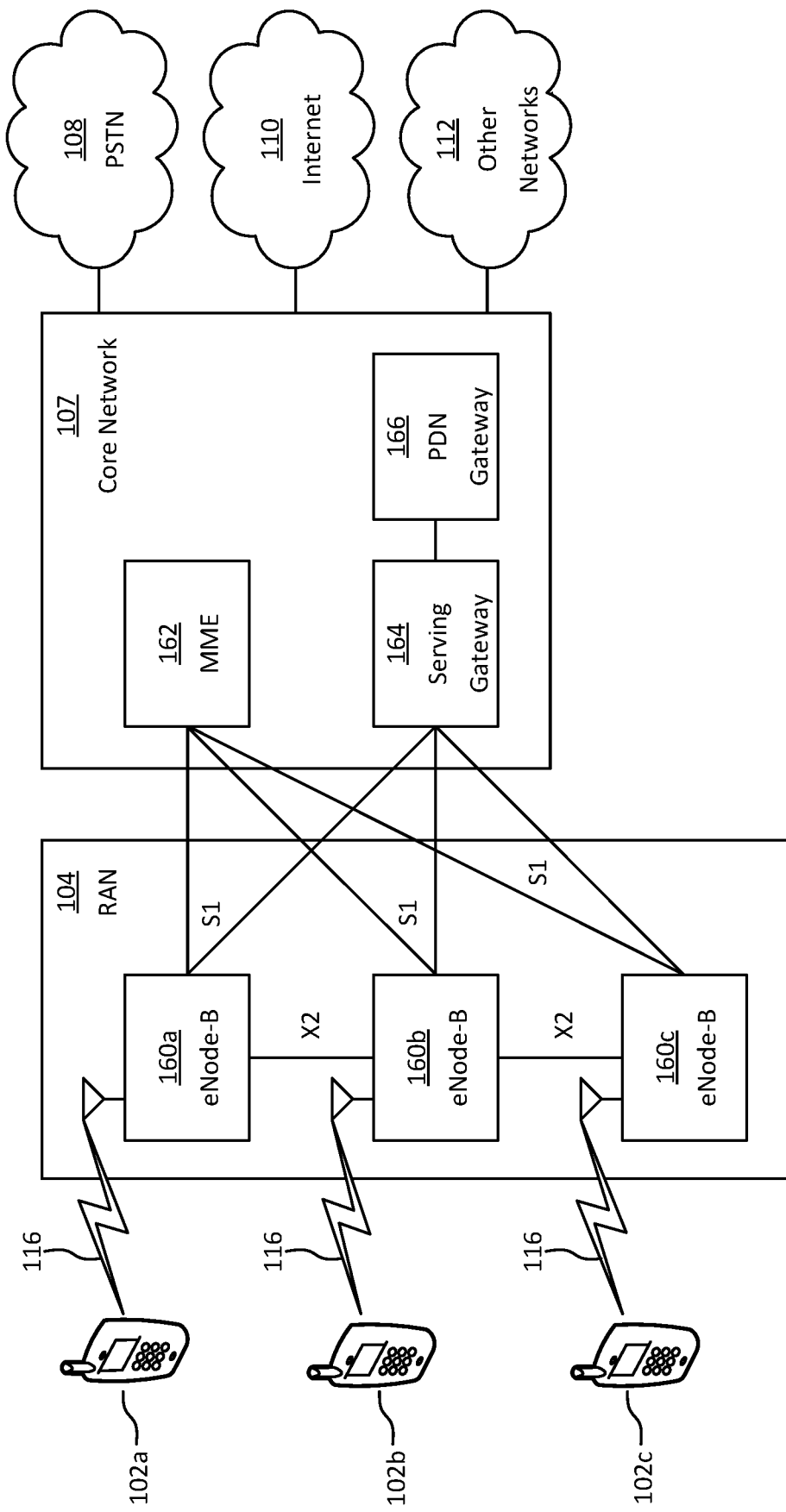
FIG. 9D is a system diagram of another example RAN and core network.

FIG. 9D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 9D, the eNode-Bs 160a, 160b, 160c may communicate with one another over an X2 interface.

The core network 107 shown in FIG. 9D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 9E:
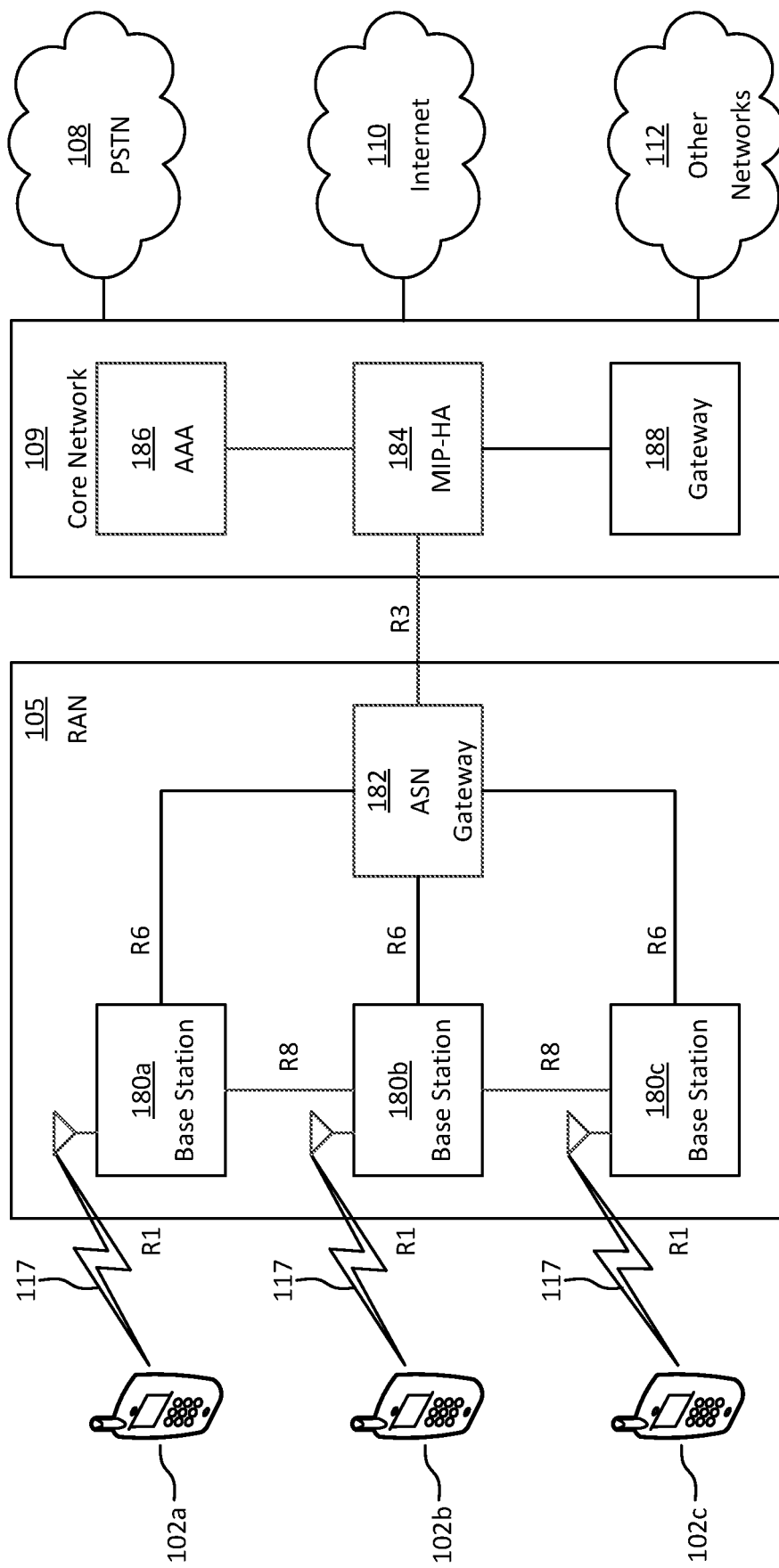
FIG. 9E is a system diagram of another example RAN and core network.

FIG. 9E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. The communication links between the different functional entities of the WTRUs 102a, 102b, 102c, the RAN 105, and the core network 109 may be defined as reference points.

As shown in FIG. 9E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QOS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 9E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 9E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 9A, 9C, 9D, and 9E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 9A-9E are provided by way of example only, and it is understood that the subject matter disclosed and claimed herein may be embodied or implemented in any similar communication system, whether presently defined or defined in the future.

Figure 9F:
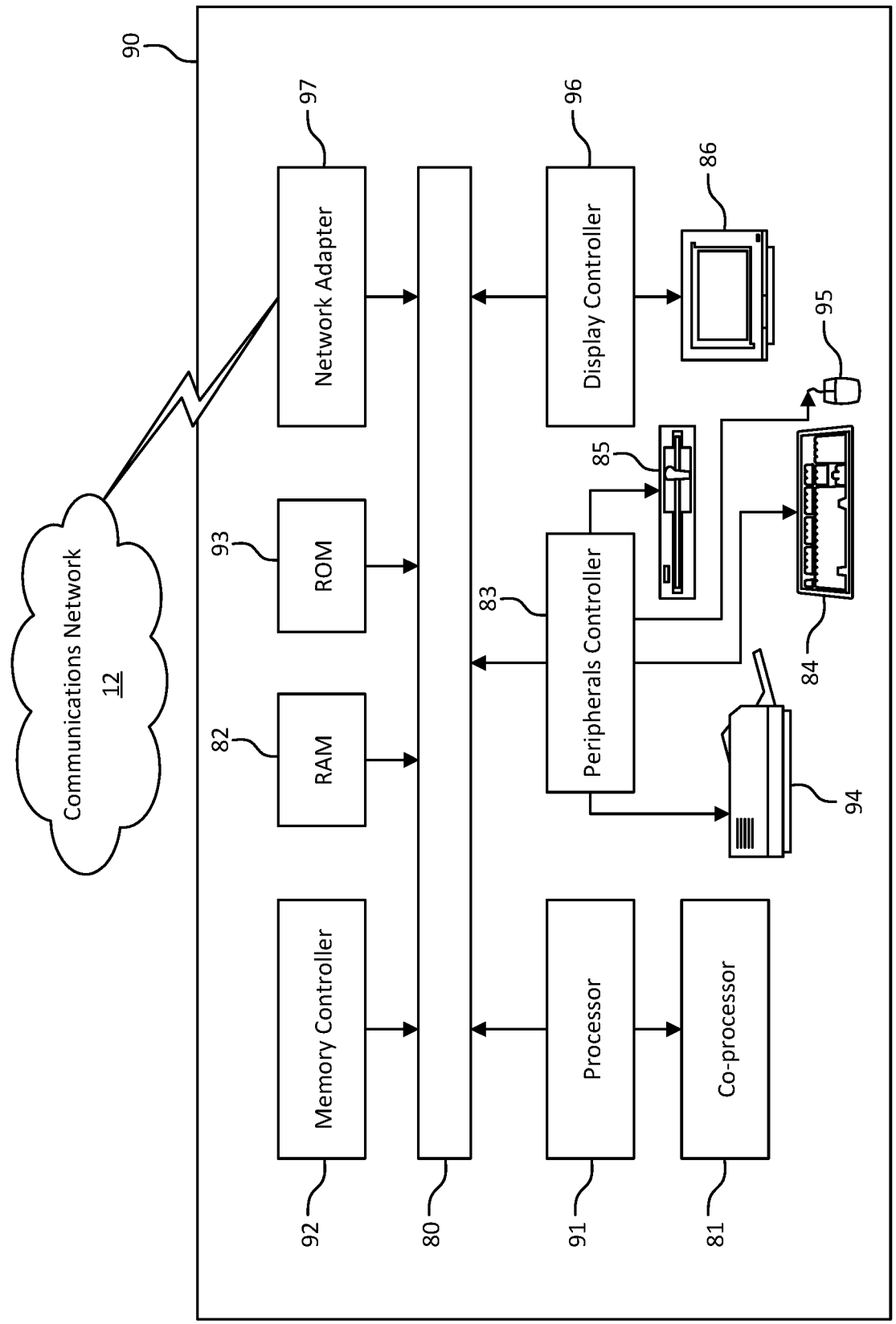
FIG. 9F is a block diagram of an example computing system.

FIG. 9F is a block diagram of an exemplary computing system 90 in which one or more apparatuses of the communications networks illustrated in FIGS. 9A, 9C, 9D, and 9E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 9A-9E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

Figure 9G:
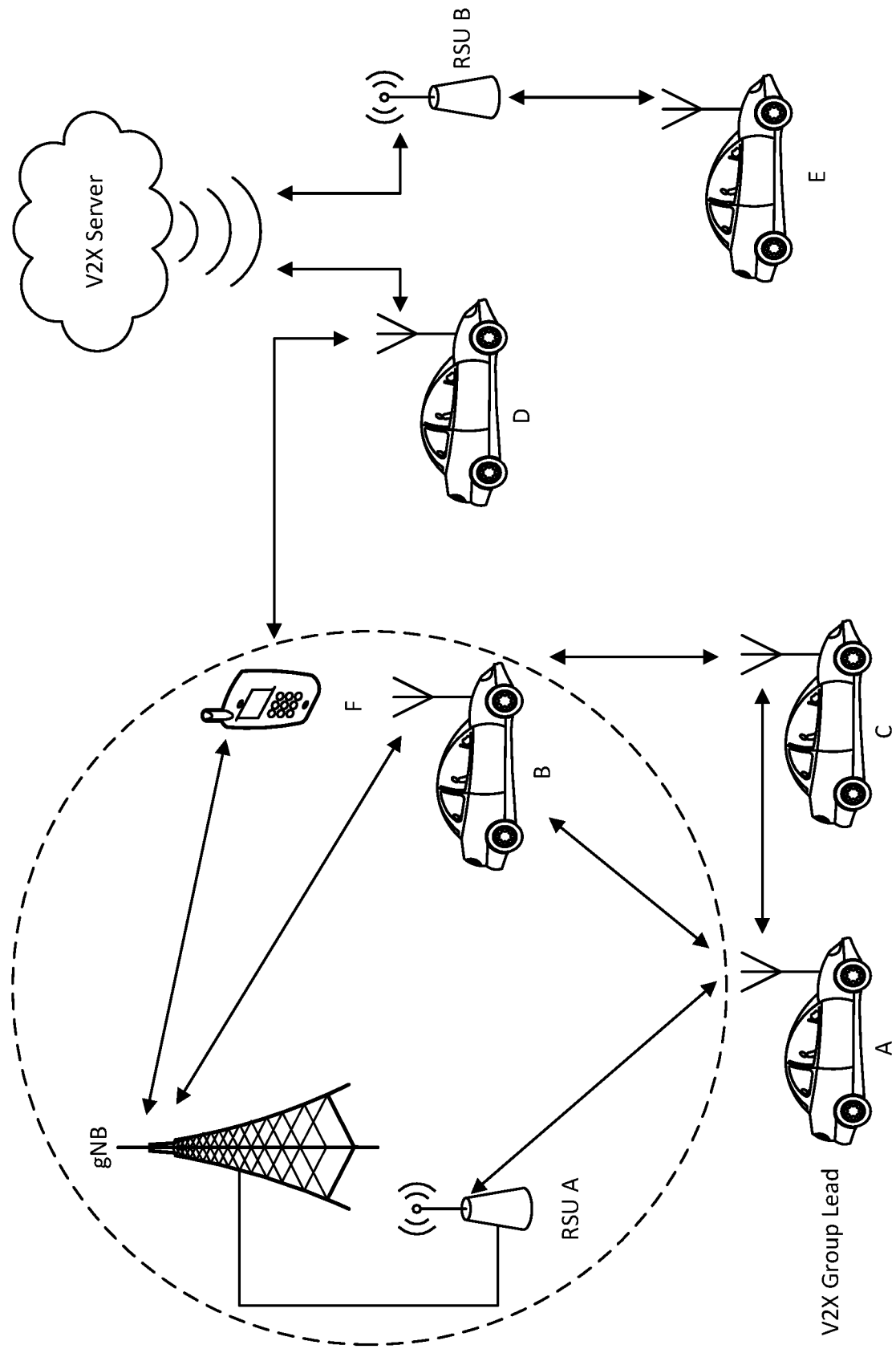
FIG. 9G is a block diagram of another example communications system.

FIG. 9G illustrates one embodiment of an example communications system 111 in which the methods and apparatuses described and claimed herein may be embodied. As shown, the example communications system 111 may include wireless transmit/receive units (WTRUs) A, B, C, D, E, F, a base station, a V2X server, and a RSUs A and B, though it will be appreciated that the disclosed embodiments contemplate any number of WTRUs, base stations, networks, and/or network elements. One or several or all WTRUs A, B, C, D, E can be out of range of the network (for example, in the figure out of the cell coverage boundary shown as the dash line). WTRUs A, B, C form a V2X group, among which WTRU A is the group lead and WTRUs B and C are group members. WTRUs A, B, C, D, E, F may communicate over Uu interface or Sidelink (PC5) interface.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

TABLE 1

APPENDIX
Abbreviations

| | |
|---|---|
| AAA | Authentication, Authorization, and Accounting |
| AAA-S | AAA Server |
| AF | Application Function |
| AMF | Access and Mobility Management Function |
| AS | Application Server |
| AUSF | Authentication Server Function |
| CAG | Closed Access Group |
| DN | Data Network |
| DN-AAA | Data Network AAA Server |
| EAP | Extensible Authentication Protocol |
| eMBB | Enhanced Mobile Broadband |
| EPLMN | Equivalent PLMN |
| HPLMN | Home PLMN |
| IP | Internet Protocol |
| LAN | Local Area Network |
| MIoT | Massive Internet of Things |
| MT | Mobile Termination |
| NAS | Non-Access Stratum |
| NPN | Non-Public Network |
| NSSAI | Network Slice Selection Assistance Information |
| N3IWF | Non-3GPP Interworking Function |
| OCI | Onboarding Capability Information |
| O-SNPN | Onboarding Mode SNPN |
| PCO | Protocol Configuration Operations |
| PEI | Permanent Equipment Identifier |
| PLMN | Public Land Mobile Network |
| PNI-NPN | Public Network Integrated NPN |
| RAN | Radio Access Network |
| RRC | Radio Resource Control |
| SD | Slice Differentiator |
| SMF | Session Management Function |
| SNPN | Standalone NPN |
| S-NSSAI | Single NSSAI |
| SST | Slice/Service Type |
| SUPI | Subscription Permanent Identifier |
| TE | Terminal Equipment |
| UE | User Equipment |
| UPF | User Plane Function |
| URLLC | Ultra-Reliable Low Latency Communications |
| URSP | UE Route Selection Policy |
| VPLMN | Visited PLMN |
| V2X | Vehicle to Anything |
| 5GS | 5G System |

TABLE 2

Standardized SST values

| Slice/Service type | SST value | Characteristics |
|---|---|---|
| eMBB | 1 | Slice suitable for the handling of 5G enhanced Mobile Broadband. |
| URLLC | 2 | Slice suitable for the handling of ultra-reliable low latency communications. |
| MIoT | 3 | Slice suitable for the handling of massive IoT. |
| V2X | 4 | Slice suitable for the handling of V2X services. |

TABLE 3

S-NSSAI information element

Length of S-NSSAI contents (octet 2)
This field indicates the length of the included S-NSSAI contents, and it can have the following values. Depending on the value of the length field the following S-NSSAI contents are included:
Bits
8 7 6 5 4 3 2 1
0 0 0 0 0 0 0 1 SST
0 0 0 0 0 0 1 0 SST and mapped HPLMN SST
0 0 0 0 0 1 0 0 SST and SD
0 0 0 0 0 1 0 1 SST, SD and mapped HPLMN SST
0 0 0 0 1 0 0 0 SST, SD, mapped HPLMN SST and mapped HPLMN SD
All other values are reserved.
Slice/service type (SST) (octet 3)
This field contains the 8 bit SST value. The coding of the SST value part is defined in 3GPP TS 23.003.

TABLE 3-continued

S-NSSAI information element

Slice differentiator (SD) (octet 4 to octet 6)
This field contains the 24 bit SD value. The coding of the SD value part is defined in 3GPP TS 23.003.
If the SST encoded in octet 3 is not associated with a valid SD value, and the sender needs to include a mapped HPLMN SST (octet 7) and a mapped HPLMN SD (octets 8 to 10), then the sender shall set the SD value (octets 4 to 6) to "no SD value associated with the SST".
Mapped HPLMN Slice/service type (SST) (octet 7)
This field contains the 8 bit SST value of an S-NSSAI in the S-NSSAI(s) of the HPLMN to which the SST value is mapped. The coding of the SST value part is defined in 3GPP TS 23.003.
Mapped HPLMN Slice differentiator (SD) (octet 8 to octet 10)
This field contains the 24 bit SD value of an S-NSSAI in the S-NSSAI(s) of the HPLMN to which the SD value is mapped. The coding of the SD value part is defined in 3GPP TS 23.003.

NOTE 1:
Octet 3 shall always be included.
NOTE 2:
If the octet 4 is included, then octet 5 and octet 6 shall be included.
NOTE 3:
If the octet 7 is included, then octets 8, 9, and 10 may be included.
NOTE 4:
If the octet 8 is included, then octet 9 and octet 10 shall be included.

TABLE 4

S-NSSAI information element with SST Mask and SD Mask

Length of S-NSSAI contents (octet 2)
This field indicates the length of the included S-NSSAI contents, and it can have the following values. Depending on the value of the length field the following S-NSSAI contents are included:
Bits
8 7 6 5 4 3 2 1
0 0 0 0 0 0 0 1 SST
0 0 0 0 0 0 1 0 SST and mapped HPLMN SST
0 0 0 0 0 1 0 0 SST and SD
0 0 0 0 0 1 0 1 SST, SD and mapped HPLMN SST
0 0 0 0 1 0 0 0 SST, SD, mapped HPLMN SST and mapped HPLMN SD
1 0 0 0 1 1 0 1 SST, SD, mapped HPLMN SST, and mapped HPLMN SST Mask
1 0 0 0 1 0 0 0 SST, SD, mapped HPLMN SST, mapped HPLMN SD, mapped HPLMN SST Mask, and mapped HPLMN SD
All other values are reserved.
Slice/service type (SST) (octet 3)
This field contains the 8 bit SST value. The coding of the SST value part is defined in 3GPP TS 23.003.
Slice differentiator (SD) (octet 4 to octet 6)
This field contains the 24 bit SD value. The coding of the SD value part is defined in 3GPP TS 23.003.
If the SST encoded in octet 3 is not associated with a valid SD value, and the sender needs to include a mapped HPLMN SST (octet 7) and a mapped HPLMN SD (octets 8 to 10), then the sender shall set the SD value (octets 4 to 6) to "no SD value associated with the SST".
Mapped HPLMN Slice/service type (SST) (octet 7)
This field contains the 8 bit SST value of an S-NSSAI in the S-NSSAI(s) of the HPLMN to which the SST value is mapped. The coding of the SST value part is defined in 3GPP TS 23.003.
Mapped HPLMN Slice differentiator (SD) (octet 8 to octet 10)
This field contains the 24 bit SD value of an S-NSSAI in the S-NSSAI(s) of the HPLMN to which the SD value is mapped. The coding of the SD value part is defined in 3GPP TS 23.003.
Mapped HPLMN Slice/service type (SST) Mask (octet 11)
This field contains the 8 bit SST MASK value that is used by the UE to determine what features, or capabilities, of the slice are supported in the VPLMN.
Mapped HPLMN Slice differentiator (SD) Mask (octet 12 to octet 14)
This field contains the 24 bit SD MASK value that is used by the UE to determine what features, or capabilities, of the slice are supported in the VPLMN.

NOTE 1:
Octet 3 shall always be included.
NOTE 2:
If the octet 4 is included, then octet 5 and octet 6 shall be included.
NOTE 3:
If the octet 7 is included, then octets 8, 9, and 10 may be included.
NOTE 4:
If the octet 8 is included, then octet 9 and octet 10 shall be included.

TABLE 5

S-NSSAI Enhanced to Carry SNPN Information

Length of S-NSSAI contents (octet 2)
This field indicates the length of the included S-NSSAI contents, and it can have the following values. Depending on the value of the length field the following S-NSSAI contents are included:
Bits
8 7 6 5 4 3 2 1
0 0 0 0 0 0 0 1 SST
0 0 0 0 0 0 1 0 SST and mapped HPLMN SST
0 0 0 0 0 1 0 0 SST and SD
0 0 0 0 0 1 0 1 SST, SD and mapped HPLMN SST
0 0 0 0 1 0 0 0 SST, SD, mapped HPLMN SST and mapped HPLMN SD
0 0 0 1 0 0 1 0 SST, mapped SNPN SST, and SNPN ID
0 0 0 1 0 1 0 1 SST, SD, mapped SNPN SST, and SNPN ID
0 0 0 1 1 0 0 0 SST, SD, mapped SNPN SST, mapped SNPN SD, and SNPN ID
All other values are reserved.
Slice/service type (SST) (octet 3)
This field contains the 8 bit SST value. The coding of the SST value part is defined in 3GPP TS 23.003.
Slice differentiator (SD) (octet 4 to octet 6)
This field contains the 24 bit SD value. The coding of the SD value part is defined in 3GPP TS 23.003.
If the SST encoded in octet 3 is not associated with a valid SD value, and the sender needs to include a mapped HPLMN SST (octet 7) and a mapped HPLMN SD (octets 8 to 10), then the sender shall set the SD value (octets 4 to 6)
to "no SD value associated with the SST".
Mapped HPLMN Slice/service type (SST) (octet 7)
This field contains the 8 bit SST value of an S-NSSAI in the S-NSSAI(s) of the HPLMN to which the SST value is mapped. The coding of the SST value part is defined in 3GPP TS 23.003.
Mapped HPLMN Slice differentiator (SD) (octet 8 to octet 10)
This field contains the 24 bit SD value of an S-NSSAI in the S-NSSAI(s) of the HPLMN to which the SD value is mapped. The coding of the SD value part is defined in 3GPP TS 23.003.
Mapped SNPN Slice/service type (SST) (octet 7)
This field contains the 8 bit SST value of an S-NSSAI in the S-NSSAI(s) of the SNPN to which the SST value is mapped. The coding of the SST value part is defined in 3GPP TS 23.003.
Mapped SNPN Slice differentiator (SD) (octet 8 to octet 10)
This field contains the 24 bit SD value of an S-NSSAI in the S-NSSAI(s) of the SNPN to which the SD value is mapped. The coding of the SD value part is defined in 3GPP TS 23.003.
SNPN Identity
This field contains the SNPN Identity that is associated with the mapped SNPN SST and mapped SNPN SD. The encoding a combination of PLMN-Identifier (see clause 12.1 of TS 23.003) and Network Identifier (NID) (see clause 12.7 of TS 23.003)

NOTE 1:
Octet 3 shall always be included.
NOTE 2:
If the octet 4 is included, then octet 5 and octet 6 shall be included.
NOTE 3:
If the octet 7 is included, then octets 8, 9, and 10 may be included.
NOTE 4:
If the octet 8 is included, then octet 9 and octet 10 shall be included.

We claim:

1. A wireless transmit/receive unit (WTRU), comprising circuitry including a transmitter, a receiver, a processor and a memory, configured to:
   receive first broadcasted information from a network, the first broadcasted information comprising an onboarding support indicator;
   send, to the network, a first request, the first request indicating system information be broadcasted on-demand, the system information being associated with a group identifier;
   receive, from the network, second broadcasted information comprising the group identifier;
   determine, using the second broadcasted information, to perform an onboarding operation with the network;
   send, to the network, (i) a non-access stratum (NAS) registration request comprising a first onboarding indication and (ii) a radio resource control (RRC) message comprising a second onboarding indication;
   receive, from the network, standalone non-public network (SNPN) credentials for an SNPN; and
   register with the SNPN based on the SNPN credentials.

2. The WTRU of claim 1, wherein the WTRU is configured to communicate with an access and mobility management function (AMF), the AMF being selected by the network based on the second onboarding indication.

3. The WTRU of claim 1, wherein at least one of the NAS registration request and RRC message comprises information to assist the network in determining a network function that can be used to authenticate the WTRU based on onboarding credentials of the WTRU.

4. The WTRU of claim 1, wherein at least one of the NAS registration request and RRC message comprises an indication that the WTRU desires to authenticate the network.

5. The WTRU of claim 1, wherein any of the first and second broadcasted information comprises an indication of whether the network supports a control plane onboarding procedure, a user plane onboarding procedure, or both the control plane onboarding procedure and the user plane onboarding procedure.

6. The WTRU of claim 1, wherein any of the first and second broadcasted information comprises an indication of types of network slices that are supported by the network.

7. The WTRU of claim 1, wherein the SNPN credentials comprise a subscription permanent identifier (SUPI) and an SNPN identity.

8. The WTRU of claim 7, wherein the SNPN credentials further comprise information necessary for the WTRU to establish a tunnel between the WTRU and a non-3GPP interworking function (N3IWF) of the SNPN.

9. The WTRU of claim 1, further configured to switch to a manual network selection mode or an automatic network selection mode.

10. The WTRU of claim 1, further configured to receive the SNPN credentials during a registration procedure.

11. The WTRU of claim 1, further configured to receive the SNPN credentials in an NAS Message.

12. The WTRU of claim 1, further configured to:
receive authentication, authorization, and accounting (AAA) information from the network;
direct, based on the AAA information, application traffic towards an AAA server of the network, and
receive the SNPN credentials from the AAA server.

13. The WTRU of claim 12, wherein further configured to receive the AAA information during a registration procedure.

14. The WTRU of claim 12, further configured to receive the AAA information in a policy.

15. A network apparatus at a Radio Access Network (RAN) node, comprising circuitry including a transmitter, a receiver, a processor and a memory, configured to:
transmit first broadcast information comprising an onboarding support indicator;
receive a first request, the first request indicating system information be broadcasted on-demand, the system information being associated with a group identifier;
transmit second broadcast information comprising the group identifier;
receive, from a wireless transmit/receive unit (WTRU), (i) a non-access stratum (NAS) registration request comprising a first onboarding indication and (ii) a radio resource control (RRC) message comprising a second onboarding indication;
select, based on the second onboarding indication, an access and mobility management function (AMF) to communicate with the WTRU;
send, to the AMF, the NAS registration request;
receive, from the AMF, a registration response; and
send, to the WTRU, the registration response.

16. The network apparatus of claim 15, wherein:
the RRC message further comprises an identifier or a credential type; and
the network apparatus being configured to select, based on the second onboarding indication, an AMF to communicate with the WTRU comprises the apparatus being configured to select the AMF based on the second onboarding indication in combination with the identifier or credential type.

17. The network apparatus of claim 15, wherein:
the RRC message further comprises a domain identifier or a device capability indication; and
the network apparatus being configured to select, based on the second onboarding indication, an AMF to communicate with the WTRU comprises the apparatus being configured to select the AMF based on the second onboarding indication in combination with the domain identifier or device capability indication.

18. A method implemented in wireless transmit/receive unit (WTRU), the method comprising:
receiving first broadcasted information from a network, the first broadcasted information comprising an onboarding support indicator;
sending, to the network, a first request, the first request indicating system information be broadcasted on-demand, the system information being associated with a group identifier;
receiving, from the network, second broadcasted information comprising the group identifier;
determining, using the second broadcasted information, to perform an onboarding operation with the network;
sending, to the network, (i) a non-access stratum (NAS) registration request part comprising a first onboarding indication and (ii) a radio resource control (RRC) message comprising a second onboarding indication;
after receipt of a registration response, receiving, from the network, standalone non-public network (SNPN) credentials for an SNPN; and
register with the SNPN based on the SNPN credentials.

19. The method of claim 18, further comprising communicating with an access and mobility management function (AMF), the AMF being selected by the network based on the second onboarding indication.

20. The method of claim 18, wherein at least one of the NAS registration request and RRC message comprises information to assist the network in determining a network function that can be used to authenticate the WTRU based on onboarding credentials of the WTRU.

21. The method of claim 18, wherein at least one of the NAS registration request and RRC message comprises an indication that the WTRU desires to authenticate the network.

22. The method of claim 18, wherein any of the first and second broadcasted information comprises an indication of whether the network supports a control plane onboarding procedure, a user plane onboarding procedure, or both the control plane onboarding procedure and the user plane onboarding procedure.

23. The method of claim 18, wherein any of the first and second broadcasted information comprises an indication of types of network slices that are supported by the network.

24. The method of claim 18, wherein the SNPN credentials comprise a subscription permanent identifier (SUPI) and an SNPN identity.

25. The method of claim 24, wherein the SNPN credentials further comprise information necessary for the WTRU to establish a tunnel between the WTRU and a non-3GPP interworking function (N3IWF) of the SNPN.

26. The method of claim 18, further comprising switching to a manual network selection mode or an automatic network selection mode.

27. The method of claim 18, wherein the SNPN credentials are received during a registration procedure.

28. The method of claim 18, wherein the SNPN credentials are received in an NAS Message.

29. The method of claim 18, further comprising:
receiving authentication, authorization, and accounting (AAA) information from the network; and
directing, based on the AAA information, application traffic towards an AAA server of the network,
wherein the SNPN credentials are received from the AAA server.

30. The method of claim 29, wherein the AAA information is received during a registration procedure.

31. The method of claim 29, further comprising receiving a policy, wherein the policy comprises the AAA information.

* * * * *